United States Patent [19]

Cook

[11] 4,446,458
[45] May 1, 1984

[54] MONITORING AND CONTROL SYSTEM

[76] Inventor: Donald Cook, 927 Mulford, Evanston, Ill. 60202

[21] Appl. No.: 302,094

[22] Filed: Sep. 14, 1981

[51] Int. Cl.³ .................. H04Q 9/00; H04M 11/04
[52] U.S. Cl. .................. 340/825.06; 340/310 CP; 340/538; 340/825.14
[58] Field of Search .................. 340/825.06, 825.07, 340/825.08, 825.14, 310 R, 538, 310 CP, 518, 505

[56] References Cited

U.S. PATENT DOCUMENTS

| | | | |
|---|---|---|---|
| 3,962,547 | 6/1976 | Pattantyus-Abraham | 340/310 R |
| 4,040,046 | 8/1977 | Long et al. | 340/310 CP |
| 4,101,834 | 7/1978 | Stutt et al. | 340/310 R |
| 4,148,021 | 4/1979 | Watanabe | 340/505 |
| 4,262,283 | 4/1981 | Chamberlain et al. | 340/518 |
| 4,316,179 | 2/1982 | Bliss et al. | 340/538 |
| 4,339,746 | 7/1982 | Ulicki et al. | 340/518 |
| 4,342,985 | 8/1982 | Desjardins | 340/518 |

OTHER PUBLICATIONS

2039402A, Aug. 6, 1980, Great Britain, Kabat et al, Class 340-538 (11 Shts. Dwgs; 24 pp. of Spec.).

Primary Examiner—Donald J. Yusko
Attorney, Agent, or Firm—Mason, Kolehmainen, Rathburn & Wyss

[57] ABSTRACT

A carrier current security monitoring and control system utilizes the alternating current power distribution system for residential, commercial, and industrial applications employs a synchronously gated, stable radio frequency carrier. A continuously supervised remote monitoring system comprising a central module and a plurality of remote modules, operating in a full duplex transmission mode for maximum reliability and integrity in a hostile transmission environment is provided.

16 Claims, 17 Drawing Figures

CENTRAL MODULE

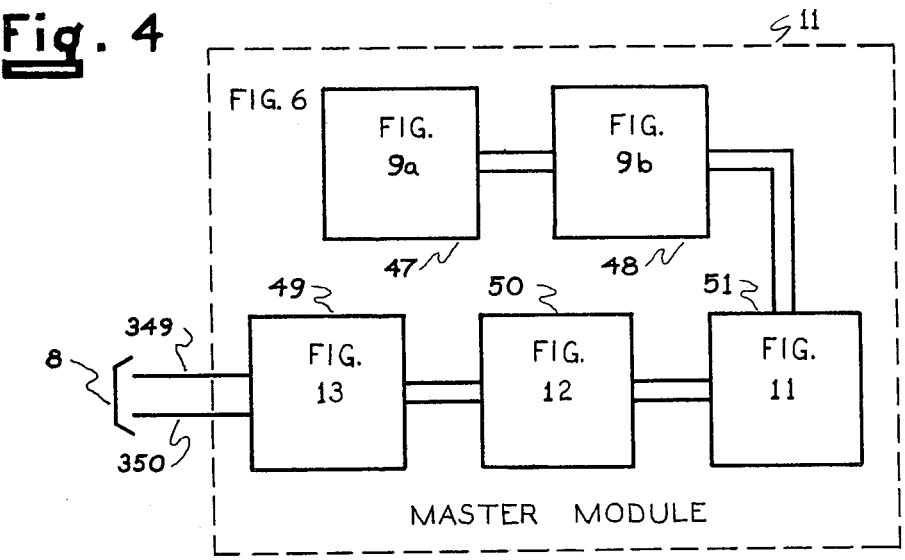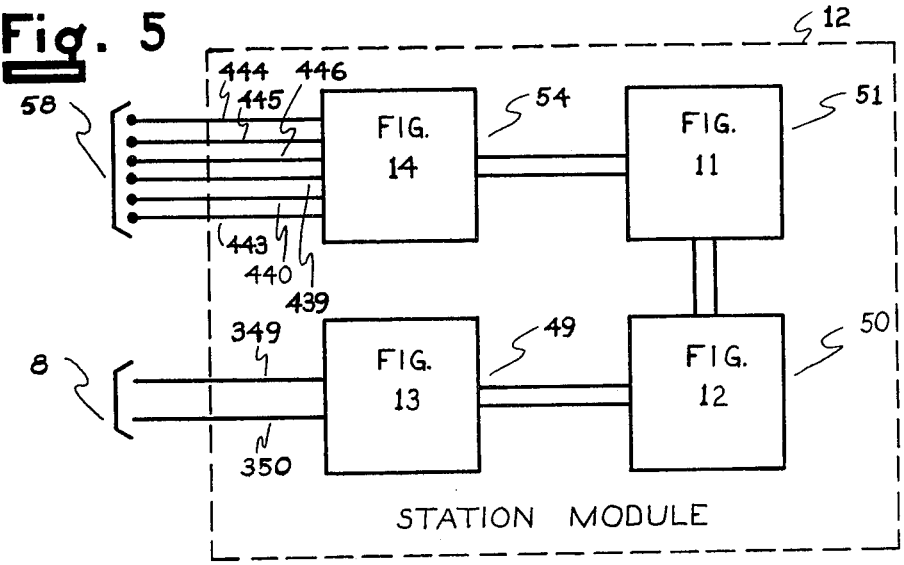

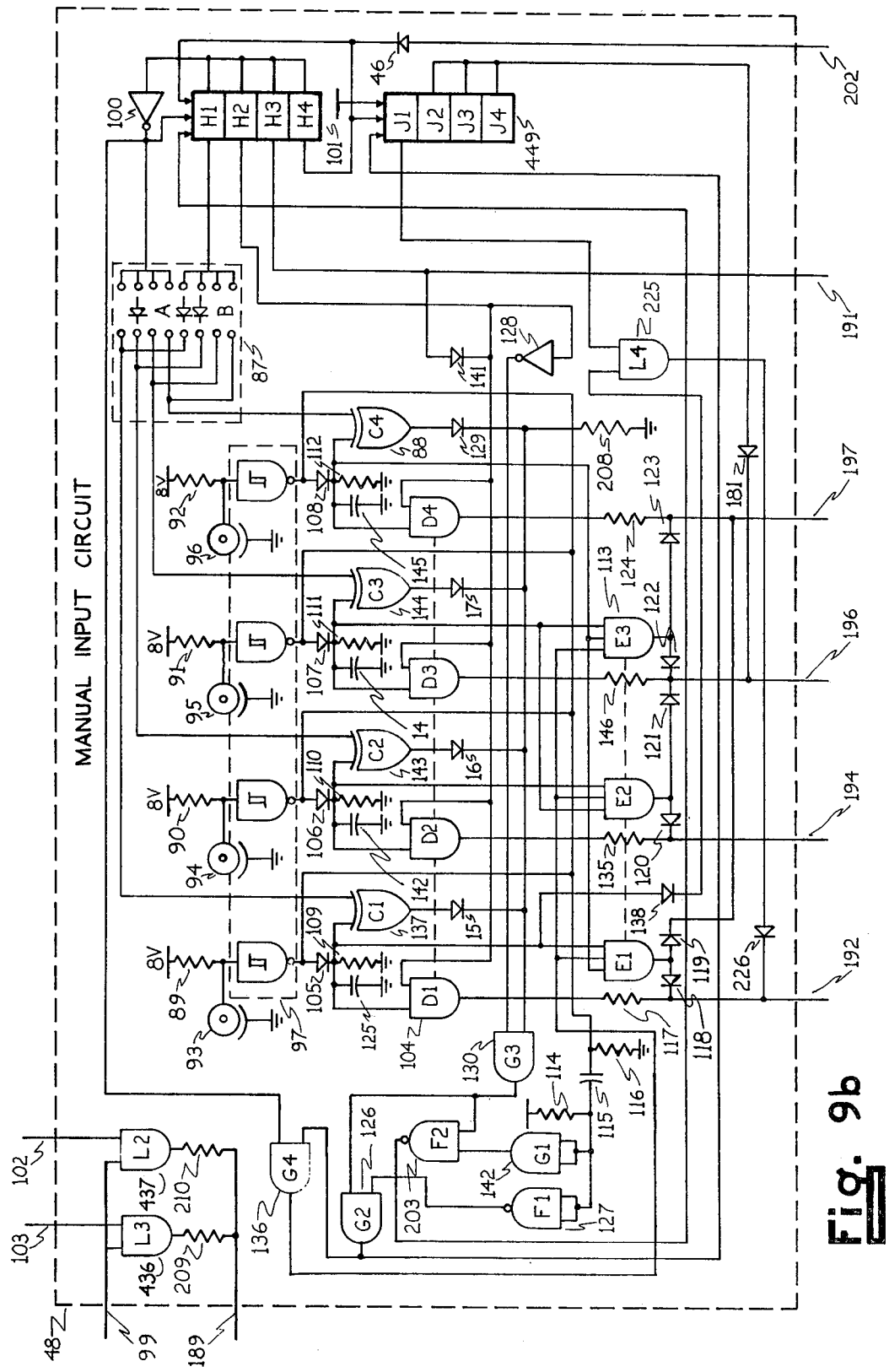

CONTROLLED OUTPUT (X) OR AUDIO ALARM (Y) CIRCUIT

SENSOR SCAN AND ALARM DECODER CIRCUIT

MONITORING AND CONTROL SYSTEM

BACKGROUND OF THE INVENTION

The use of carrier current signals on alternating current on power distribution systems has been known and utilized for decades in many applications from controlling power distribution circuits to such simple functions as a home remote switch controller.

One of the principle problems concerning carrier current systems is the increasing amount of noise on the AC power lines not only from devices having arcing commutators, i.e., universal motors, centrifugal switch starting motors but also from high frequency noise caused by semiconductor devices such as SCR's and triacs that use phase angle switching. The steep wavefront of these devices creates noise throughout the frequency spectrum. Another source of noise is related to the de-energization of relays, solenoids, vacuum cleaners and food blenders since such devices have severe noise generating characteristics which can occur at any time during the AC power cycle. The application of a square wave, i.e., digital pulse to any conductor including power lines, also causes the generation of radio frequency interference (RFI) across the radio frequency spectrum. This RFI is a serious problem in our present electronic environment as evidenced in the proliferation of devices presently used causing sufficient interference to cause the FCC to impose strict standards on their use, and legislative action has been taken to minimize the problem.

Previous disclosures attempt to minimize the deleterious effects of this noise by transmitting signals at a particular portion of the AC power sinewave.

Another technique is to send repetitive transmissions of the same signal with the assumption that this procedure will provide reliable operation of the system.

Systems previously disclosed implementing binary pulses of short duration (50 microseconds—2 milliseconds) consisting of pulses or frequency shift keyed (FSK) transmissions in a simplex mode cannot cope properly with noise over any appreciable distance and cannot insure the signals will be received or properly interpreted.

Present carrier current devices that utilize digital pulse techniques attempt to avoid causing excessive RFI by limiting the energy impressed on the conductors at the expense of both limiting the range of operation and reducing noise immunity capabilities.

The teachings of the present invention require the observance of certain principles of electronic phenomena that has been well defined and of particular techniques involving the philosophy of communication theory.

The use of electrical conductors transitting 50–60 Hz frequency power on relatively low impedance loads requires for each branch circuit a calculable amount of energy (1-2 Kw) for standard residential wiring, and more for commercial or industrial circuits. This load is usually resistive and/or inductive in nature.

In any given installation, the load on each branch circuit is not constant or equal. Therefore, the impedance of each circuit will change. When applying a carrier frequency on these branch circuits for the purpose of communication or control at, say, two orders of magnitude higher than the power frequency (50–60 Hz) up to the 600–6000 Hz range, the changing load impedance still has an appreciable deteriorating effect. To circumvent any difficulty in this area, a frequency is chosen for the carrier to be high enough to utilize the "Skin Effect" phenomenon. This approach minimizes the power requirements of the carrier oscillators, and insures that the carrier frequency will be able to reach all of the units of the total system. Experimentally, this frequency range is between 150 kHz and 350 kHz. Also important is the characteristic of the carrier frequency waveform. The optimum configuration should be sinusoidal thereby minimizing the creation of a steep wavefront which generates objectional RFI.

The lack of reliability of previously disclosed systems preclude their use in many applications, especially in commercial and industrial systems. Their use in residential applications have not been shown to be entirely successful in extended systems, particularly in a high load, high noise environment.

Other disclosures have recognized and attempted to resolve another problem of AC power carrier current systems, notably the ability to properly supervise the various elements of the system to insure the reliable functioning and operation of the units. This includes the capability to detect any intentional or inadvertent tampering or interference of the units using techniques that will not contribute to false alarms.

As mentioned in previous disclosures, off-normal indications are accomplished by amplitude modulating a carrier used by a plurality of alarm devices. If several alarms occur and are transmitted simultaneously, modulated sum and difference frequencies can occur causing false conditions to exist decreasing the system reliability.

Any attempt to test the integrity of any system units by occasional manual testing does not provide assurance that the system is operable except at the time or occurrence of the test and does not provide continuous supervision.

Any system utilizing amplitude modulated signals is limited in its capabilities, firstly, by the amount of AC line noise which tends to modify the amplitude modulation of the RF carrier thereby limiting the reliability of the system and secondly, by decreasing the range of the RF signal due to severe deterioration caused by low impedance, high load AC circuits.

From the foregoing comments and the following information, an analysis can be made to eliminate many of the deficiencies described above, and in addition, several technical and design improvements will be implemented resulting in a much improved system.

The transmission of information has several important considerations, two of these being speed and accuracy. The speed of data transmission is usually determined by the particular application. Monitoring and control systems in the applications under consideration do not require high speed data transmission, since the response time (transfer function) of the systems are in the range of seconds, not milliseconds, for the functional operation of these electronic and/or electromechanical servo-mechanisms.

The slower the rate of data transmission or signals, the more reliable the data transfer will be since each unit of the data transmission exists for a longer period of time and can be integrated over this time period to verify its existence regardless of the presence of extraneous, co-existing signals composing part of an AC power line carrier environment. The techniques used to provide parity bits, checksums, averaging, or additional data bits to be used for error detection has a minimal effect in a hostile transmission medium except to avoid errors in receiver response but fail to provide reliable operation.

A more realistic approach in this environment would be to receive an identical return signal verifying the transmitted signal prior to terminating the transmitted signal, with the signal consisting of a single unit of information. Since the transmitted signal continues until a return verification signal is received, the receiver has ample time to integrate the received signal and ignore the noise co-existing on the conductors prior to transmitting an identical return signal. This technique would require a minimum of two carrier channels to permit full duplex communication. Using this mode of operation permits the use of a variable transmission time, i.e., a short period for a noise-free AC line, and a long transmission period for a noisy AC line, still maintaining a high degree of reliability.

Also, the RF oscillators required for transmitting signals comprise synchronously gated, stable, sinusoidal oscillators. The output of the oscillator has to be sinusoidal when impressed on the AC line since the assault of a square wave or steep wavefront on any conductor, including power lines, causes the generation of RFI across the radio frequency spectrum. The sinusoidal waveform minimizes the RFI thereby resolving a problem mentioned earlier.

Another serious deficiency of previously described remote alarm and control systems using carrier current signals is concerned with the installation techniques of the various local and remote modules required for the system. The claimed principle advantage of carrier current equipment used in apartment and building alarm or monitoring systems is predicated on the condition that an electrician or electrical contractor will not be required to accomplish the installation. In most urban communities, the local electrical code requires an electrician to perform any electrical modifications on the AC power wiring. Since the previous disclosures (with two exceptions limited to operating appliances) have to be wired into the AC power circuits, this situation drastically upgrades the cost and expertise required to install the alarm or monitoring system presently provided by alarm company installers handling wired low voltage systems either in residential or commercial applications.

The present disclosure permits all of the required low voltage (6–18 v) sensor wiring to be performed and connected to the local and remote modules prior to plugging the modules into AC power duplex receptacles.

Another feature of the present disclosure eliminates a major deficiency in disclosed previous carrier current systems. This deficiency is the omission of any continuous system module supervision to detect any malfunction or tampering to defeat the system automatically without manual intervention or periodic testing.

In any monitoring system, it is essential that the system design is reliable and is not subject to false alarms. The failure, at times, of control systems is not as critical as alarm systems; therefore, the design cannot be marginal and overlook the severe carrier current environments.

The presently disclosed system also provides an automatic correlation program to permit additional modules to be installed in addition to the previously-installed correlated master module group, without requiring any system or fixed program alterations.

SUMMARY OF THE INVENTION

The object of the present invention is to provide a security monitoring and control system capable of operating reliably throughout the range of normal to extremely hostile transmission environments utilizing a central module and a plurality of remote functional device modules operating over AC power distribution systems.

In the preferred embodiment of this invention, the system consists of a central module, one or more master modules, and a plurality of station modules, the station modules being responsive to a plurality of sensors, and all of the modules being pluggable into receptacles of the AC power distribution system.

A further embodiment of this invention is the utilization of a full duplex transmission system composed of a plurality of carrier current channels having as a signal source a sinusoidal, synchronously gated, stable RF oscillator means transformer coupled to said AC power distribution system.

An important aspect of this invention is the use of a plurality of carrier current channel pairs having two channels for each full duplex transmission, each pair of channels serving a plurality of master and station modules and an associated central module.

Another aspect of this invention is the utilization of a full duplex transmission system between the central module and any one of the plurality of remote modules, the signals originating on one channel and returning on the other channel of the pair verifying the return signal prior to terminating the originating signal, the signal consisting of a single unit of information.

A further aspect of this invention is accomplished by using a full duplex transmission mode, whereby a variable transmission period is achieved, both in the transmission and verification signal. When the transmission occurs on a noise-free AC line, the transmission time required is short, and when the transmission occurs on a noisy AC line, the signal has to be integrated over a longer period of time, thereby increasing the transmission time. This transmission period has a programmable maximum transmission time that, when exceeded, causes a transmission failure alarm.

A further embodiment of this invention transmits a plurality of data signals in a sequential manner, each data signal being transmitted in a full duplex mode, wherein the plurality of the transmitted data signals required is dictated either by the type of information requested or by the status of the remote master or station modules.

A still further embodiment of this invention utilizes a central module responsive to a preprogrammed sequence of operations stored in a nonvolatile memory, a random access working memory, a plurality of input/output registers with control circuitry, the addressing and control of the included elements and signal processing being implemented by a microprocessor, such as a M6801 large-scale integrated circuit.

A still further aspect of the present invention comprises communication means from a plurality of remote system installations composed of a central module, one or more master modules, and a plurality of station modules to transfer information to storage means in the central module which analyzes the data and transmits pertinent data via transmission means to a central station computer installed in a secure location and staffed by security personnel who determine an appropriate further response. The transmission means include a standard FSK protocol over switched telephone lines. Alternative means, such as CATV, cable, radio means, or direct wire, can be implemented to provide this transmission capability to the central station computer.

The remote master and station modules of this invention are responsive to central module selectable signals and the central module is responsive to selected master and station module signals, and selected signals comprise a plurality of sequential signal means capable of providing several identification and status signals of a particular remote master or station module utilizing the preferred full-duplex transmission mode.

The central module is responsive to manually coded input signal means from a master module using the preferred transmission means. The input signals are analyzed by the central module processor to perform the coded requests such as emergency conditions, or if an authorization code had been entered prior to a command code, the central module would initiate control commands to remote station modules associated with that particular master module.

The master modules comprise audio transmission means for communicating with the central station and visual indicators responsive to central module signal means utilizing the preferred full-duplex transmission means to indicate master module and associated station module status conditions.

An object of this invention is to provide a plurality of remote station module signal means capable of providing identification and status signals for any particular remote station module to the central module, each signal utilizing a full duplex transmission mode in a sequential manner, such information being provided by internal storage means capable of storing status and control information. The described storage means is responsive to external sensor means and central module communication means. The station module is responsive to a plurality of sensor means responsive to the status of any desired measurable parameter.

Another object of this invention is to provide station module monitor circuit means composed of an alternating pulse, DC current signal means supplied through any included sensor loop, with the station module monitoring means being responsive to any attempt to bypass or disable part or all of the monitored loop consisting of one or a plurality of sensor means.

A further object of the present invention is to provide an alternate power source means responsive to any AC power disruption. All of the system modules include a battery and a battery charger to insure continuous operation and circuitry responsive to a low battery condition for alerting the central station computer.

A still further object of the present invention is to provide a program subroutine timing means to initiate a system status report every twenty-four hours for transmission to the central station computer.

A further important object of this invention is to provide an electro-mechanical interlock on all the described modules wherein any tampering of the module is transmitted, via the central module, to the central station computer to indicate a particular module is being disturbed.

An important aspect of this invention includes the organization of a plurality of program subroutines stored in a read-only memory responsive to a program management routine stored in the central module memory and providing the following described, but not limited to, operating procedures:

(a) A supervisory scan subroutine includes a sequential interrogation procedure for each system module, wherein a normal status requires a minimal three interrogation sequence and an off-normal or command status requires a complete interrogation to determine the specific cause of the off-normal indication to compare with the status indication stored in the central module temporary memory means.

(b) An inactive period for a fraction of a second during the supervisory scan to permit any new off-normal condition to be detected between each completed interrogation. The first off-normal present inhibits subsequent signals until the first signal has been classified.

(c) An alarm or new off-normal module condition search subroutine wherein the initial signal originated at a particular module is identified and searched in the memory to select the module identification signal, transmit the signal to start the full-duplex transmission procedure to store and analyze the received off-normal module data. The off-normal signal can be manually originated at a master module identified by type of module signal and interpreted as either an emergency or command signal, then processed by the central module as required. Alternatively, the central module can transmit command and alarm signals to the remote modules as required or as requested by the central station computer.

(d) An initial start-up or restart central station subroutine initializes the central module and initiates a correlation subroutine to assign designated modules into the proper master group in the central module memory means.

(e) A pulse or touch-tone subroutine defines procedures for the central module to operate the switched network telephone system to connect the central station computer to a telephone line via approved telephone coupling means.

(f) An FSK duplex transmission subroutine is used to communicate between the central module and the central station computer to provide complete supervision of the central module systems.

Another embodiment of this invention utilizes a central station computer comprising a microprocessor, memory, input/output control, video terminal, printer, and FSK transmission to provide communication and control to the plurality of remote system installations.

One other feature of the present invention includes remote modules providing output control for controlling solid state switches or relays. This output control capability also provides means for enabling or disabling security loops by the central module from commands originated by the master module.

The procedure of transmitting information relating to setting or resetting security loops as required for commercial installations described in the trade as "openings" and "closings" is performed for each installation, and the decision whether or not to make a permanent record at the central station is determined by the user.

The disclosed invention has a preferred embodiment, the use of a "silent alarm", whereas all emergency or intrusion alarms are reported via the central module to the central station, except a fire alarm which provides an audible local alarm either as a synthesized vocal announcement or a tone coded audio alarm having the ability to identify the area in danger. If desired, the central module can permit all alarms to announce locally, and when a system failure occurs, does so automatically.

Another feature of this invention includes a manual input switch incorporated in each master module, the switch having a plurality of inputs responsive to a prescribed plurality of input codes, i.e., access codes, emergency codes, control codes, and identification codes, but not limited to the above. All input codes other than emergency codes require the use of access codes, each access code being unique to each master module and having a code selection means accessible to qualified personnel.

One important aspect of the presently disclosed invention provides means to locate and identify each sensor responsive to the disturbance or actuation of that particular sensor means, thereby permitting the central station operator to notify the system user as to the cause and precise location of the responsible sensor. This capability is important, first, to alert the security members at the system site, and second, to aid in identifying the location of a malfunction and indicate when it is repaired.

A further important aspect of this invention includes a voltage and/or current monitor supervising the switched telephone line circuit to prevent a communication failure. A failure of this circuit causes an immediate local alarm and, if required, utilizes the carrier current transmission means to communicate with another central module located elsewhere to communicate with the central station computer.

Another feature of the present invention comprises an automatic central module sentry alarm responsive to a periodic reset pulse means from the processor to reset the time out of the sentry circuitry. If a reset is not received, a local identifiable audible alarm is initiated.

A further consideration and aspect of this invention relates to an alternate method of detecting a remote module request at the central module instead of utilizing the inactive period between supervisory scan interrogations. An additional RF carrier channel can be provided that can transmit independently regardless of any state of a present operation.

Another feature of this invention is the capability to operate the remote station modules as actuators when directed by commands from the associated master modules. This feature can be used with a master module to control access doors with audio communication facilities, or to operate any electrical devices, and to indicate the operating status of the remote module controlled devices.

BRIEF DESCRIPTION OF THE DRAWING

FIG. 4 is a block diagram of the master module of the system of FIG. 1;

FIG. 5 is a block diagram of the station module of the system of FIG. 1;

DETAILED DESCRIPTION OF THE INVENTION

Figure 1:
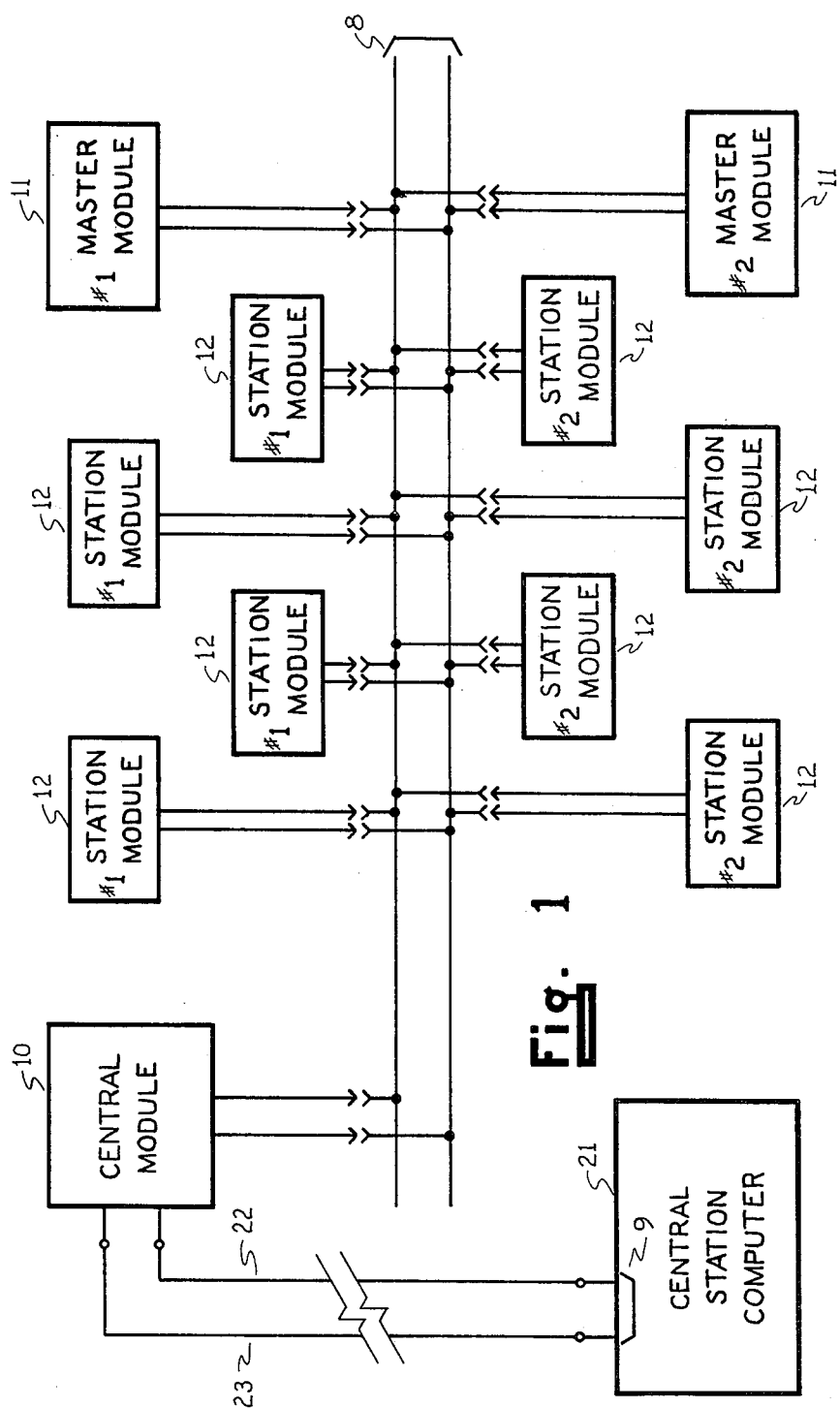
FIG. 1 is a functional block diagram of the system of the present invention.

The security monitoring and control system of the preferred embodiment as shown in FIG. 1, consists of a central control unit carrier current transmitter-receiver module 10, connected to a building power distribution system 8. This computer controlled central module 10 communicates with associated remote carrier current transmitter-receiver modules consisting of one master module 11 with a plurality of station modules 12 for each master group of remote units. The master 11 and station 12 modules are also connected to the building power distribution system 8. The central module 10 communicates via telephone lines 9 to the central station computer 21 facilities using an FSK transmission protocol.

APPLICATIONS

The application of the system of FIG. 1, in a single-user building, requires a minimal system consisting one central module 10, one master module 11, and several station modules 12 with various sensors attached to the station modules 12. In a multi-unit building providing service to many individual users thereby necessitating a larger system, the system of FIG. 1 consists of one central module 10 servicing all users, one master module 11 for each user and a plurality of station modules 12 for each user.

CENTRAL MODULE

Figure 3:
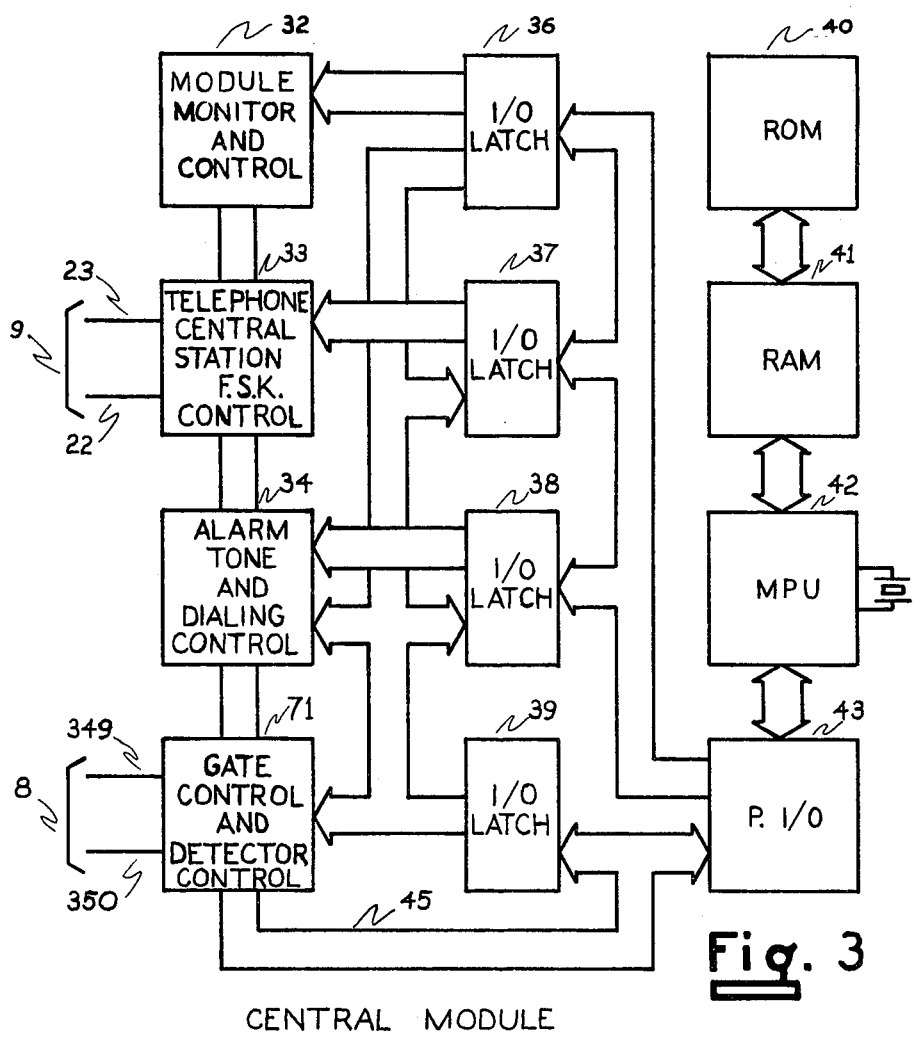
FIG. 3 is a block diagram of the central module of the system of FIG. 1.
Figure 15A:
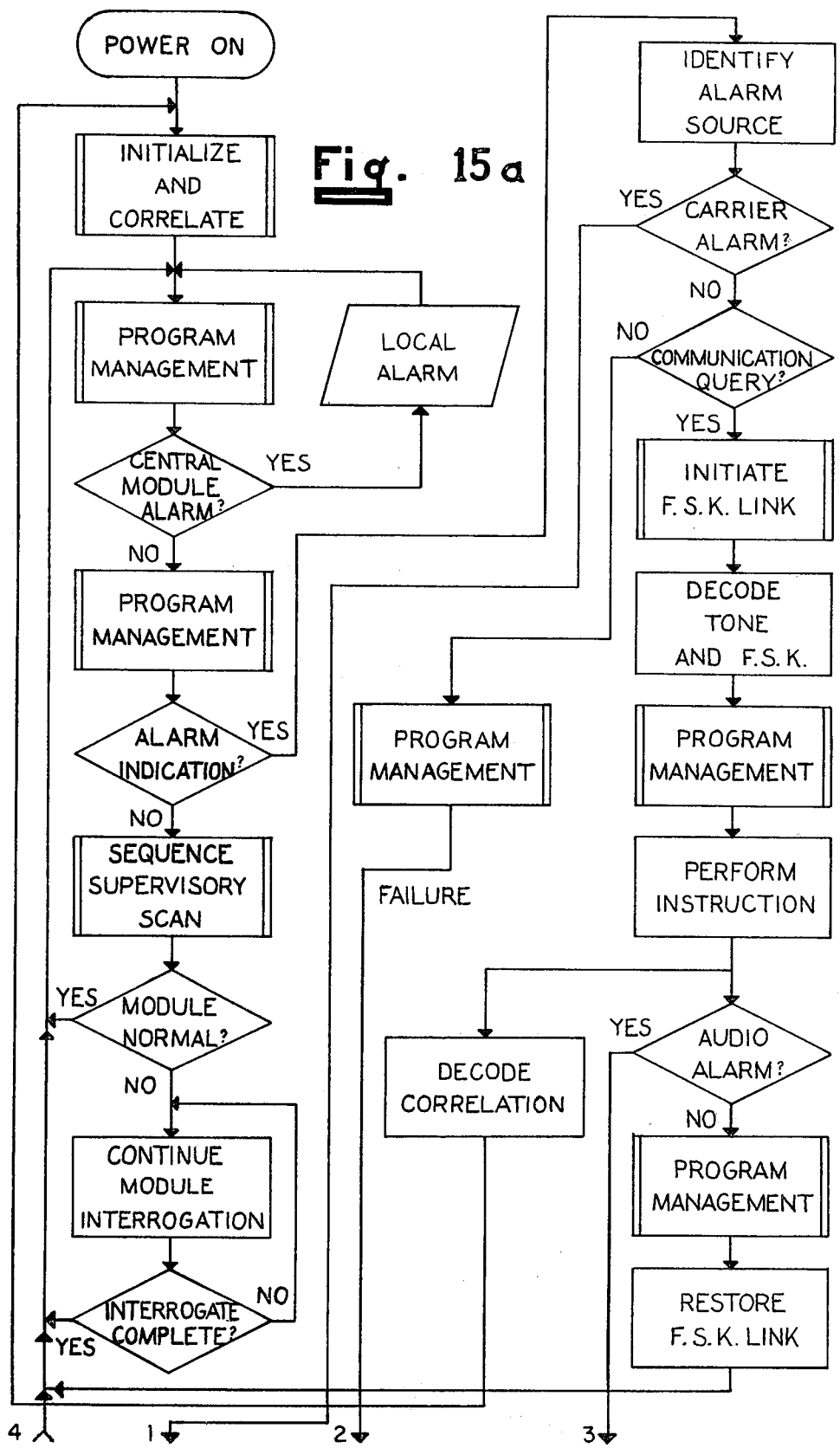
FIG. 15 (15a and 15b) is a flow diagram of a typical program and subroutines for the central module.

The central module 10 of FIG. 1 consists of the microprocessor control unit shown in FIG. 3 operating under a preprogrammed sequence of operations shown in FIG. 15 to continuously interrogate or scan the status of the master module 11 (FIG. 1), and the station modules 12 (FIG. 1) responding to any change in status. The central module 10 also responds to immediate alarms from master modules 11 and station modules 12 initiated independently of the supervisory scan function.

Figure 6:
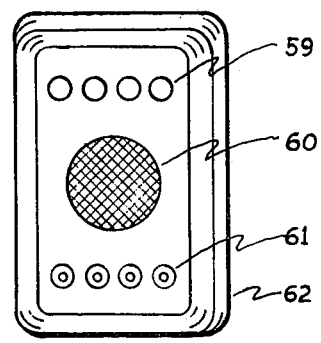
FIG. 6 is a pictorial view of the master module of the system of FIG. 1.
Figure 9A:
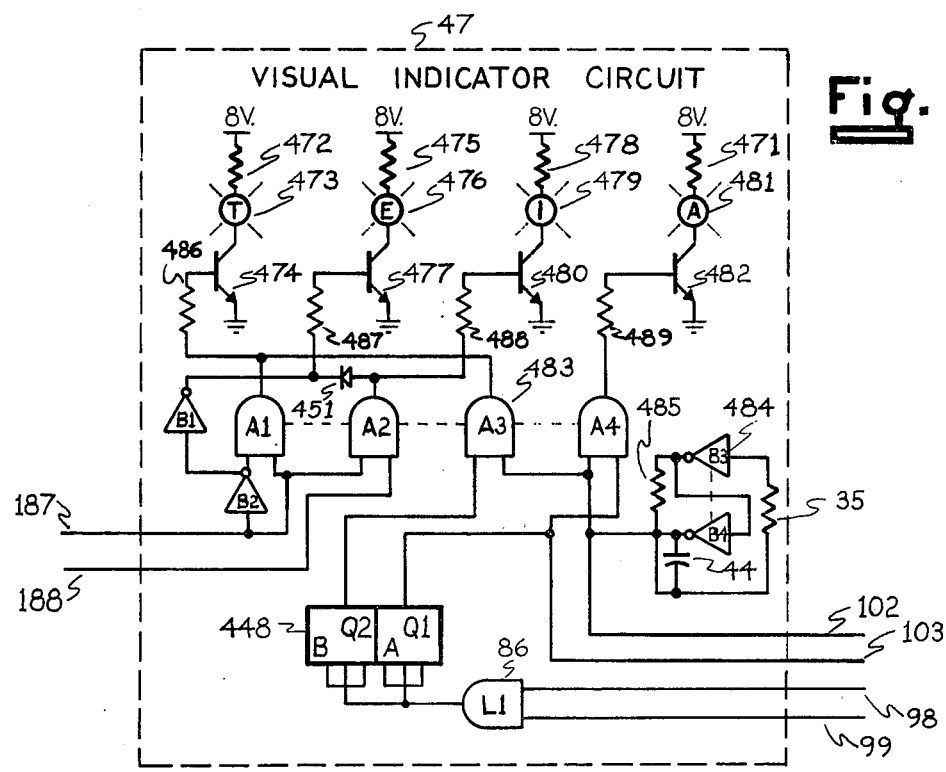
FIG. 9 (9a and 9b) is a partial schematic of the master module of the block diagram of FIG. 4.

The master module 11 (FIG. 1) via the manual inputs 93–96 (FIGS. 6 and 9b), signal the central module 10 (FIG. 1) to control the set/reset 206 gates (FIG. 12) of the sensor inputs of the station modules 12 indicating this condition on the visual indicators (lamps) of FIGS. 6 and 9a and to control register gates 448 (FIG. 9a).

Referring to FIG. 1, the central module 10, using a synchronously gated, full-duplex, RF carrier current communication channel pair (FIG. 10), continuously interrogates, in a sequential manner, the master modules 11 and the station modules 12 included in a particular area installation. This continuous interrogation is a supervisory scan that is implemented by the supervisory scan subroutine (FIG. 15a) programmed in the memory of the microprocessor (FIG. 3) of the central module 10 (FIG. 1) and initiated by either a power-up or central station 21 request (FIG. 1).

Figure 15B:
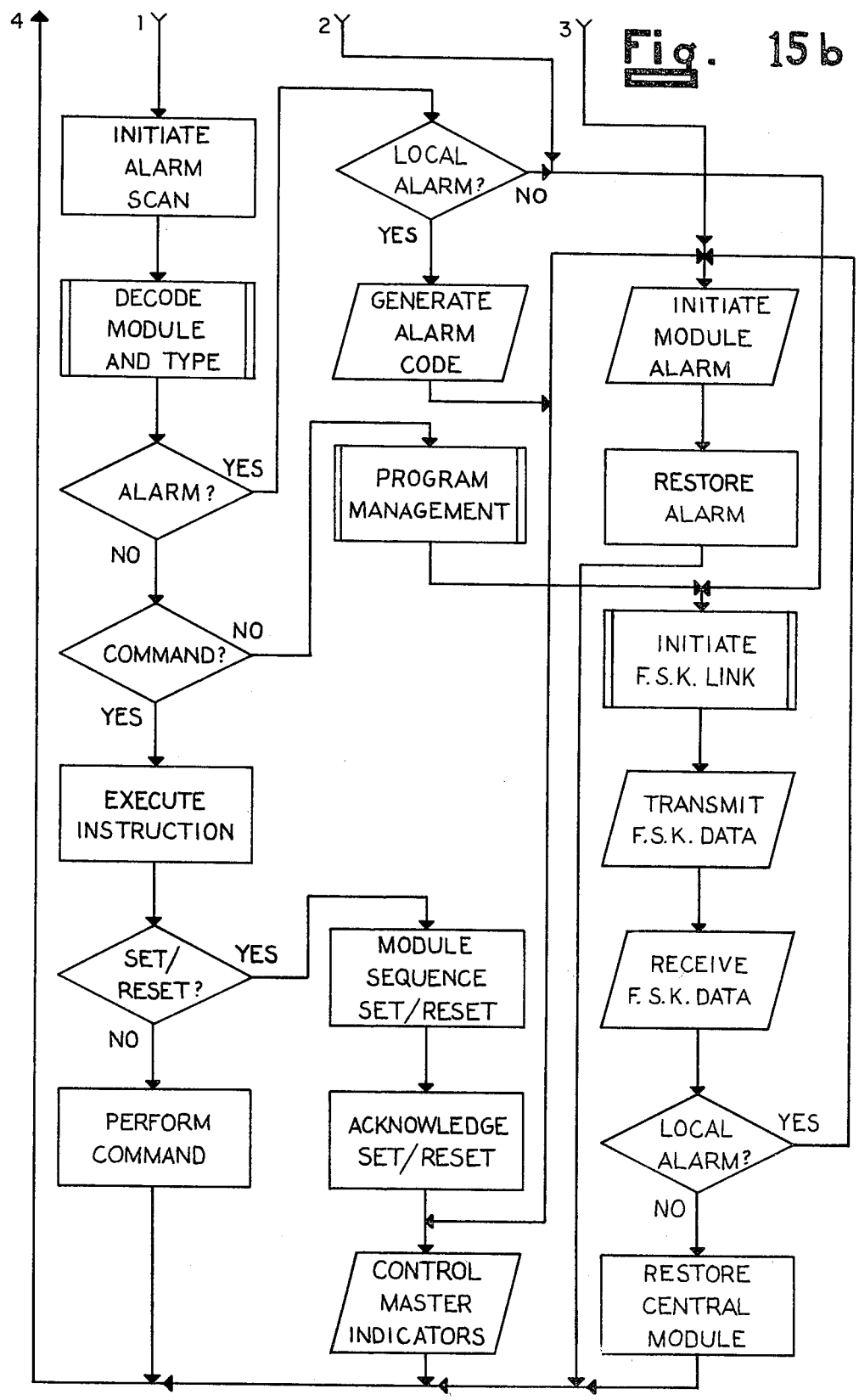

Whenever a remote module, whether a master module 11 (FIG. 1) or a station module 12 (FIG. 1) detects an input or change in status, the module goes into an alarm status. The alarmed module (11 or 12), then transmits on channel F2 or F4 (separate alarm channel) which is detected by the central module 10 (FIG. 1). The central module 10 then causes an interrupt of the "supervisory scan" routine (FIG. 15a) and transfers to an alarm scan routine (FIG. 15b) which searches in memory (FIG. 3) for a matching address signal of the alarmed module 11 or 12 (FIG. 1) and proceeds to interrogate the module 11 or 12 (FIG. 1). The type of module will be identified, say, station module 12 (FIG. 1) and the data specifying the alarm condition will be processed to determine what action the central module 10 (FIG. 1) will take. If it was a master module 11 (FIG. 1), the central module would determine whether the input was an alarm or a command before processing, as shown in FIG. 15b. If necessary, the central module 10 (FIG. 1) will notify the central station 21 (FIG. 1).

SIGNALLING METHOD

Figure 8:
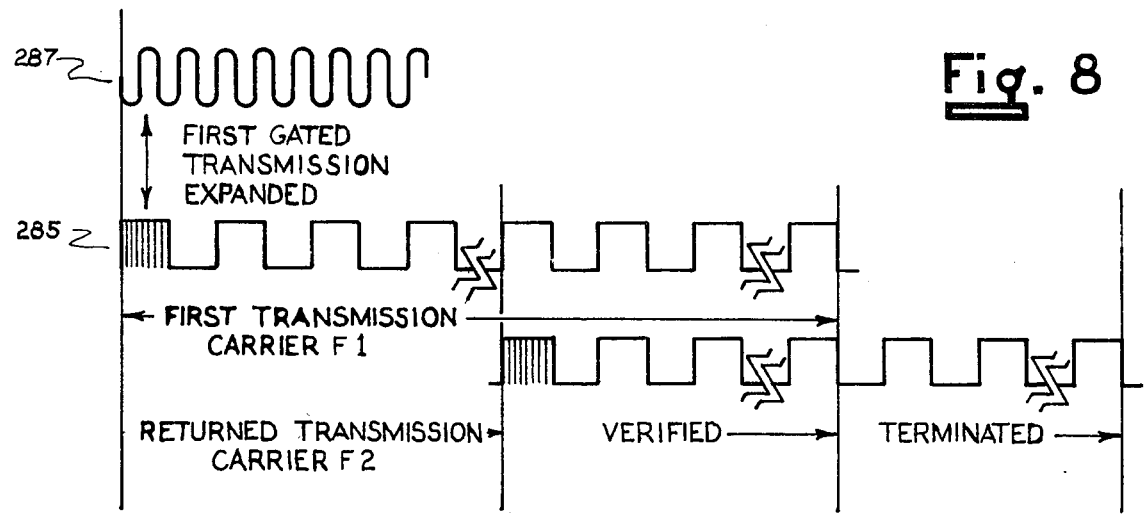
FIG. 8 is a representation of a gated full-duplex transmission mode timing for all module transmissions.

The communication protocol used between modules is shown in FIG. 8 for a single transmission signal (one of a plurality required for each module interrogation).

The central module 10 uses a transmitting RF frequency channel F1, generated by circuit 352 (FIG. 13) resonating at about 190 kHz. The F1 channel is used by the central module 10 as the supervisory and alarm scan channel.

The central module 10 uses a receiving RF frequency channel F2 detected by circuit 331 (FIG. 13) resonating at about 225 kHz. The F2 channel is a second channel of a channel pair required for the full-duplex transmission used for the "supervisory and alarm scan".

The central module 10 uses a transmitting RF frequency channel F3 generated by a second circuit 352 (FIG. 13) resonating at about 215 kHz. The F3 channel is used by the central module 10 and is the "alarm and control output" channel to initiate a central module 10 signal (FIG. 2).

The central module 10 uses a receiving RF frequency channel F4 detected by a second circuit 331 (FIG. 13) resonating at about 240 kHz. The F4 channel (if used) is the first channel of the channel pair required to initiate an alarm from modules 11 or 12 (FIG. 2) for the "alarm and control output".

Figure 13:
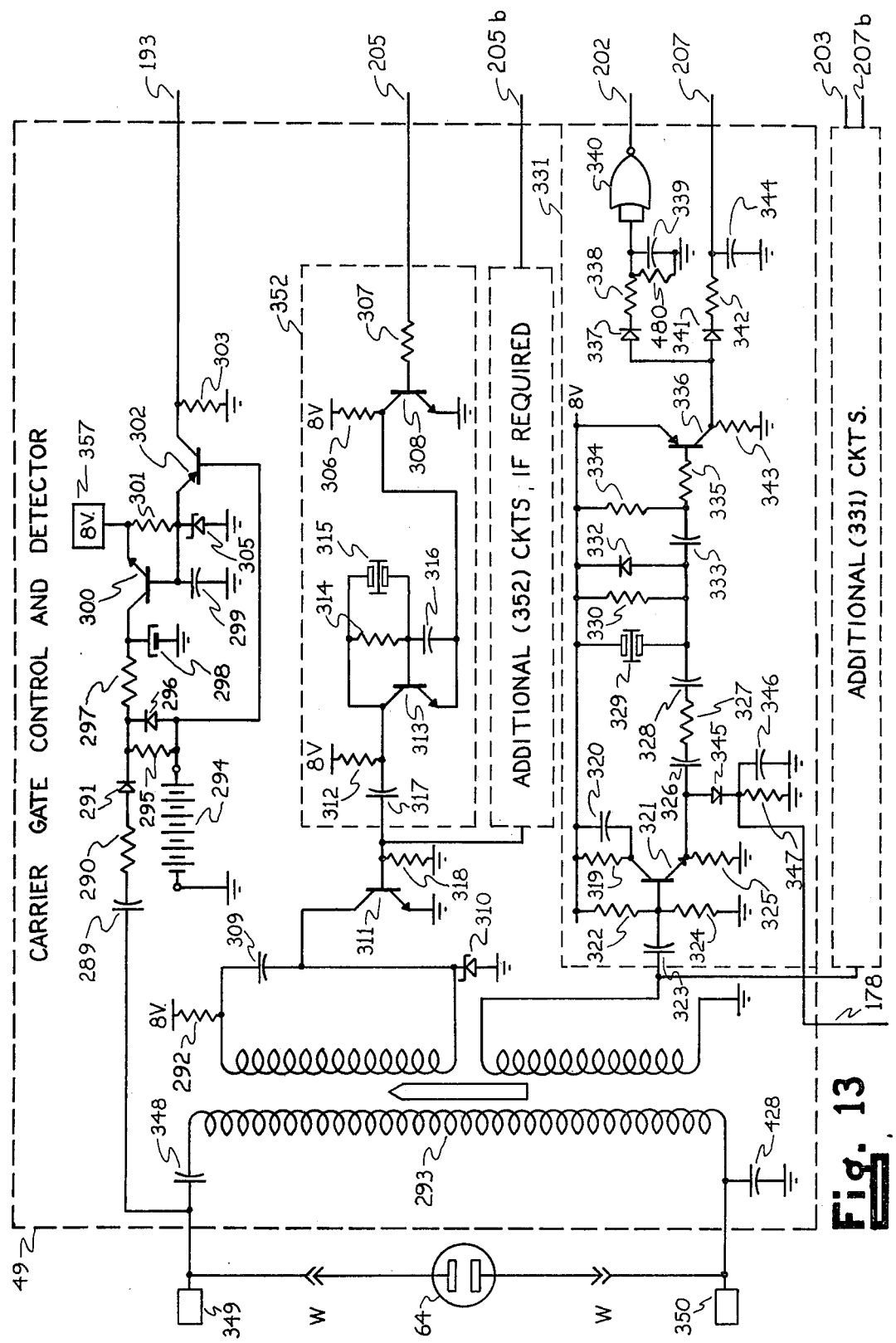
FIG. 13 is a partial schematic diagram of the central, master, and station module carrier current transmission circuits.

The master module 11 and station module 12 uses the same four channels in a reverse manner, F1 being the received channel using an identical receiving circuit 331 (FIG. 13), and the transmitting channel is F2 generated by circuit 352 (FIG. 13). Channels F3 and F4 are similarly reversed, F3 is the receiving channel and F4 the transmitting channel. To recapitulate, F1 and F2 are used for "supervisory and alarm scan" and F3 and F4 are used for "alarm and control output" RF carriers.

Figure 2:
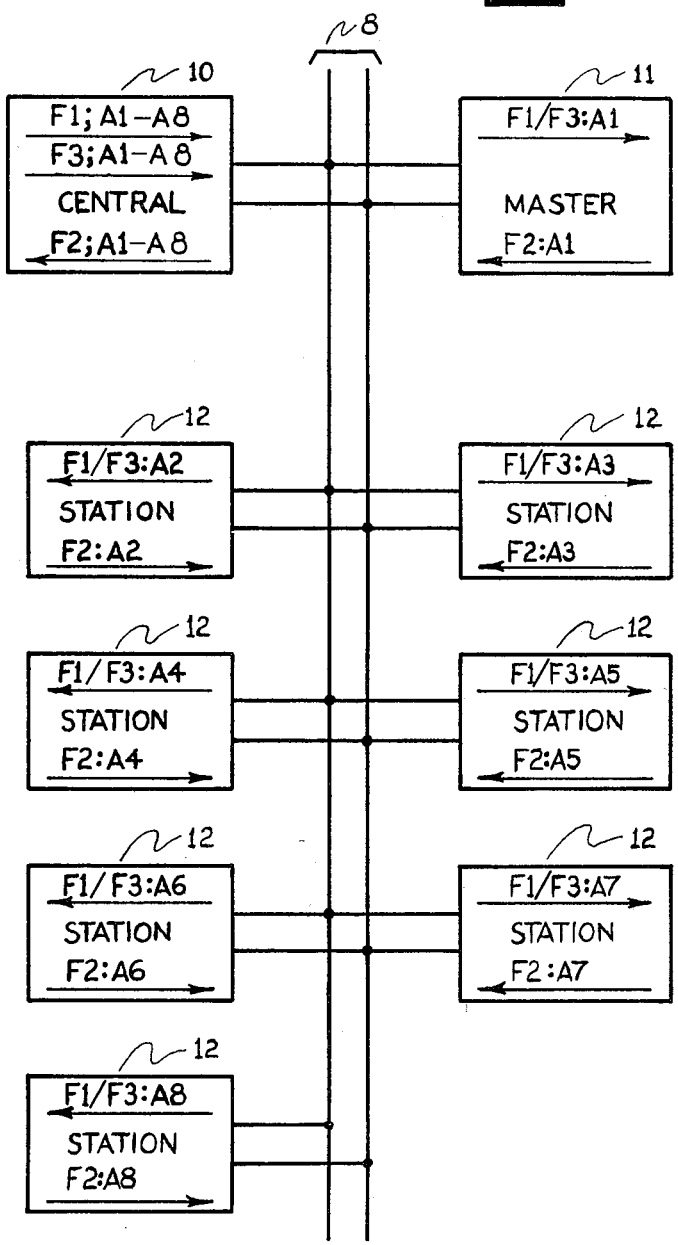
FIG. 2 is a functional block diagram of the system showing the central module, master module and station modules.

The method used to transmit information on the described carrier channels is shown in FIG. 2 for the first address coded transmission. F1:A1, for example, would indicate channel F1 and A1 would represent an address for a group module (in this case, the first address of master module 11). The central module 10, shown in FIG. 2, when operating in the "supervisory scan" mode of the subroutine shown in FIG. 15a, initiates a signal F1:A1 on the power distribution system 8 (FIG. 2). This signal is composed of an RF frequency carrier, gated at a pulse repetition rate A1 (A1 to A8 available). Only the first address signal A1 is shown in FIG. 2. This signal F1:A1 is decoded by the master module 11 (FIG. 2) having a matching pulse repetition rate comparator 217 (FIG. 12) set to respond to A1. Upon receiving the signal F1:A1, the master module 11 (FIG. 2) initiates a signal F2:A1, that is transmitted on the power distribution system 8 (FIG. 2). The central module 10 (FIG. 2) receiving this F2:A1 signal will now terminate sending F1:A1, and select the next address signal. When the signal F1:A1 is terminated, the master module 11 (FIG. 2) ceases transmitting and awaits the second required address signal F1:B1 (not shown in FIG. 2).

Alternatively, when the central module 10 (FIG. 2) is operating in the "alarm and control" mode (FIG. 15b) the carrier F3 is used. If the master module 11 of group 1 (FIG. 2) was to be addressed, the first signal would be F3:A1 (FIG. 2) and the master module 11 (FIG. 2) return would be F2:A1. The F4 carrier is used when a master module 11 or a station module 12 (FIG. 2) originates an alarm or control signal with a central module 10 return on F1. (F4 not shown on FIG. 2 since it is not required on minimal systems using the scan interval delay.)

The signalling protocol illustrated in FIG. 2 shows only the first selection address of remote modules 11 or 12 for clarity. Since the modules require up to twelve interrogations to acquire the data needed for operation, the system requires a system of coding to provide a convenient method of having a standard module that is easily modified for individual applications.

The RF channels are synchronously gated at selected pulse repetition rates to provide address and data recognition. The range of repetition rates are grouped according to use. The groups range from A1 to A8 for group (GRP) address and B1 to B8 for station (STA) address. The C1 to C8 group is status (STAT) data. The D1 to D8 group is used for correlation (CORR) data. The E1 to E8 group is used to determine type (TYPE) data. The next three groups F1–F8, G1–G8, H1–H8 are used for data (DATA) information. The next group J1–J8 is the set (SET) group. The repetition rates are determined by resistor selection for selecting the address, status, correlation and type. The remaining groups are common for all modules and are not selectable.

The diagram of FIG. 2 shows the manner of coding. For example, F1:A1 would indicate channel F1 and A1 would represent an address for a group (GRP). The designation F2:B2 represents a remote module (11 or 12) transmitting a return signal F2 to the central module 10 gated for a station (STA) address #2. The designation F1:D3 represents the central module 10, transmitting a matching return signal for master group correlation (CORR) #3. The designation F3:A1 represents the central module 10 (FIG. 2) transmitting an address signal to master station 11 (GRP) #1 on the control and alarm carrier to alert the master station 11 (FIG. 2) (GRP) #1 for a following control signal when sequenced to (SET) position.

The central module 10 (FIG. 1) is block diagrammed in FIG. 3. The microprocessor 42 (FIG. 3) is a crystal controlled central processing unit (CPU), such as a Motorola 6800, provided with a read-only memory (ROM) factory programmed unit 40 (FIG. 3) and a random-access memory 41 (FIG. 3) providing a random-access stack and working memory unit 41 (FIG. 3), and a plurality of input/output registers 36-39 (FIG. 3), controlled by a parallel input/output register 43 (FIG. 3), under the control of the microprocessor 42 (FIG. 3) responsive to a program management routine organized to operate under a program management routine responsive to external interrupt signals, internal timing clocks, and a programmed sequence of subroutines, responsive to the demands of the program management routine.

The preferred central module 10 (FIG. 1) sequence of operations are programmed, but not restricted to the following sequence:

(a) an initializing subroutine on power-up or central station request to reset all registers and initialize the central module 10 (FIG. 1) and initiate a module correlation routine to group associated modules, (b) a program management routine responsive to programmed clock intervals and priority interrupts to control and direct the response of all the included subroutines in a preferred manner comprise a self-test feature including a watch-dog sentry, (c) a supervisory scan subroutine utilizing a sequential interrogation to continuously analyze the status of all the remote modules to insure the reliability of the system, (d) a module alarm detection scan subroutine responsive to remote module alarm conditions, providing storage means for all off-normal module data and control status conditions to be transmitted to the central station computer, (e) a master module command subroutine responsive to a command type alarm transmission capable of interpreting and executing requested commands, (f) an FSK modem subroutine comprising a communication protocol to call up the central station computer 21 (FIG. 1) allowing central module 10 (FIG. 1) data exchange and storage of alarm and control data, (g) an alarm coding subroutine to provide audio code patterns to annunciate alarm conditions, (h) a module control and measurement subroutine capable of selecting a particular module for setting the control counter 206 (FIG. 12) or reading BCD measurement data.

The central module 10 (FIGS. 1 and 3) has additional equipment as shown on FIG. 3. The gate control and detector control circuit 71 (FIG. 3) consists of the circuit of FIG. 13, utilized in the central module 10 (FIG. 1), the master module 11 (FIG. 1) and the station module 12 (FIG. 1) to provide carrier current coupling to the power distribution system 8 (FIG. 1) to communicate via RF frequency techniques between all remote modules and also a telephone FSK modem 33 (FIG. 3) utilizing FCC approved coupling equipment.

The central module 10 and the modules are plugged into existing AC power distribution 8 (FIG. 1) duplex receptacles, via an isolation RF transformer 293 (FIG. 13) and a 60-cycle blocking capacitor 348 (FIG. 13). The transformer 293 (FIG. 13) has both a transmitting and receiving secondary winding, providing isolated low voltage circuitry for the remote modules.

The power supply circuit (FIG. 13) comprises capacitor 289, resistor 290, diode 291, battery trickle charging resistor 295, filter resistor 297 and capacitor 298, voltage regulator transistor 300, ripple filter capacitor 299, Zener diode voltage regulator 305, voltage monitor circuit resistor 304, transistor 302, and resistor 303, responsive to a low voltage condition and activate a low voltage alarm on lead 193, connected to the parallel I/O (input/output) register 43 (FIG. 3), and gated under program control to initiate an interrupt for low battery.

The RF frequency carrier current receiver circuit 331 (FIG. 13) includes RF transformer 293 (FIG. 13) coupling capacitor 323, and transistor biasing resistors 322 and 324, used to bias the emitter-follower transistor 321 in the linear conduction region. The integrator circuit having diode 345 (FIG. 13) and capacitor 346 with bleeder resistor 347 provides an RF frequency detection circuit responsive to any RF carrier frequency on lead 178 (FIG. 13). Lead 178 (FIG. 13) is used only for master module 11 and station modules 12 and not used in the central module 10.

The output of transistor 321 (FIG. 13) fed through coupling capacitor 326, limiting resistor 327 and isolating capacitor 328 activates the resonating characteristics of the crystal 329 (FIG. 13), the desired frequency driving transistor 336 and providing two separate integrator circuit outputs. One of the integrators consists of a rectifier 341 (FIG. 13), a resistor 342 and a capacitor 344, thereby providing an RC time constant to furnish a gated signal to phase lock loop circuit 217 (FIG. 12) via a path 207.

The phase lock loop of circuit 217 (FIG. 12) is duplicated in the gate control and detector control circuit 71 (FIG. 3) and the output of a NAND gate 271 of the PLL 217 (FIG. 12), is applied to the parallel I/O (input/output) register, e.g., Motorola 6821, 43 (FIG. 3) initiate an interrupt to the MPU (Motorola 6800) 42 (FIG. 3). The output indicates when a signal match is made by the signal selected by the I/O latch 39 (FIG. 3).

The I/O latch 39 (FIG. 3) provides the gating control for the phase lock loop 217 (FIG. 12) duplicated in the gate control and detector control circuit 71 (FIG. 3) by selecting the resistors required for the input to the phase lock loop 71 (FIG. 3) to match or generate the pulse repetition rates received by or transmitted to the master modules 11 (FIG. 1) and the station modules 12 (FIG. 1). The I/O latch 39 (FIG. 3) is controlled by the various programs in memory 40-41 (FIG. 3) via the parallel I/O 43 (FIG. 3) register.

The central module 10 (FIG. 1) has a gate control and detector control circuit 71 (FIG. 3), consisting of the gate control and detector circuit 49 (FIG. 13) and an additional circuit of the phase lock loop 217 (FIG. 12) to accommodate the interrupt requirement.

The second integrator consists of rectifier 337 (FIG. 13), resistor 338, capacitor 339, bleeder resistor 480 and gate 340 and serves to provide an end of transmission signal. This will indicate that no transmission from any master 11 or station 12 modules are being transmitted when the central module 10 (FIG. 1) is not transmitting on channel F1 or F3. If a signal is received, it would be during the scan interval delay time and initiated by a module (11 or 12) new alarm on channel F2 or F4.

The end of transmission signal from NOR gate 340 (FIG. 13) on lead 202 (FIG. 13) goes to the parallel I/O register 43 (FIG. 3) initiating an interrupt #2 to the MPU 42 (FIG. 3). The interrupt causes the program to switch from the supervisory scan routine to the alarm scan routine.

The central module 10 (FIG. 3) alarm tone and dialing control circuit 34 (FIG. 3) utilizes the second alarm and control output channel, identical to 352 (FIG. 13), to respond to signals generated by the MPU 42 (FIG. 3) outputted through the parallel I/O 43 (FIG. 3) to control the I/O latch 38 (FIG. 3) providing the gating of the alarm tone circuit 34 (FIG. 3) consisting of a 555 timer and RC time constants which are altered by the gating of the I/O latch 38 (FIG. 3), to control the alarm and control channel #2 352 (FIG. 13) that transmits on the power distribution system 8 (FIG. 1).

The dialing control 34 (FIG. 3) utilizes an integrated circuit such as, for example, an RCA 4081, to furnish gate control of the touch tone output from the I/O latch 38 (FIG. 3) under program control from the MPU 42 (FIG. 3) and the parallel I/O register 43 (FIG. 3). The circuit 34 and circuit 33 (FIG. 3) utilizes an approved telephone coupling device specified by the FCC.

The telephone control station FSK (frequency shift keying) control 33 (FIG. 3) uses a two-frequency (high and low tone) communication protocol between the central station computer 21 and the central module 10 (FIG. 1) consisting of a line-to-line transformer and an isolating relay with transistor drivers to control the operation of the circuit and the control and tone signals generated by I/O latch 37 (FIG. 3) under program control from the MPU 42 (FIG. 3) and the parallel I/O register 43 (FIG. 3).

The central module (FIG. 3) monitor and control circuit 32 (FIG. 3) consists of a watchdog timer controlled by the I/O latch 36 (FIG. 3), a module power supply monitor, and a transistor driver to initiate a local audible alarm if the power fails or the module ceases functioning.

MASTER MODULE

The master module 11 (FIG. 1), shown in the block diagram of FIG. 4, includes a visual indicator circuit 47 (FIG. 9a), a manual input circuit 43 (FIG. 9b), a sensor scan and alarm decoder circuit 51 (FIG. 11), a sequence counter and gating detector 50 (FIG. 12), and a carrier gate control and detector circuit 49 (FIG. 13). FIG. 6 shows the physical arrangement of the visual indicators 59, and the touch switches 61. An audio transducer is represented by 60 (FIG. 6).

VISUAL INDICATORS

Figure 12:
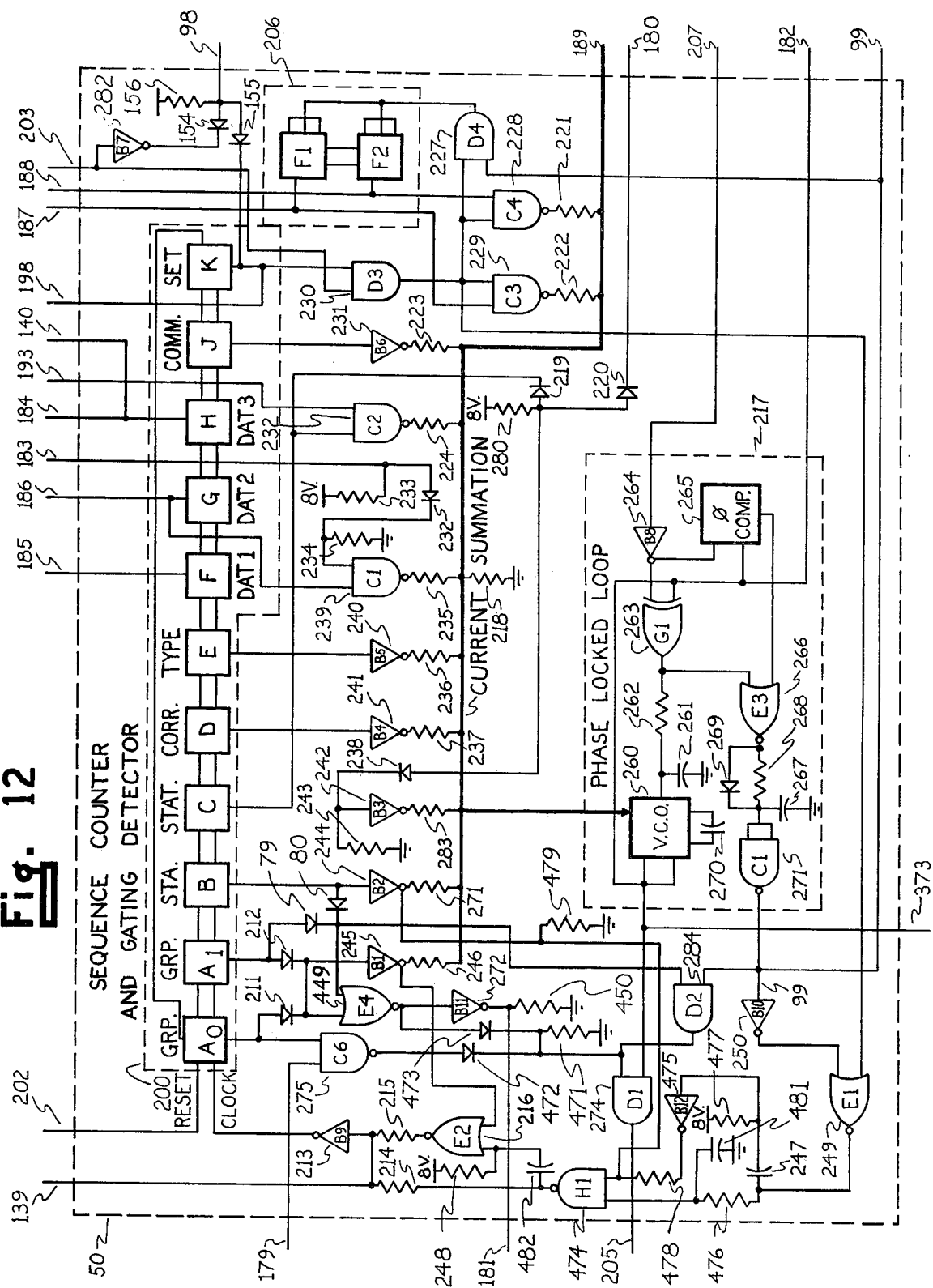
FIG. 12 is a partial schematic diagram of the master module of FIG. 4 and station module of FIG. 5.

Each of the visual indicators (FIG. 9a) such as the LED 473 (FIG. 9a), is connected to a voltage source through a current limiting resistor, such as the resistor 472, and driven by a transistor, such as the transistor 474 under the control of two AND gates, such as gates A1 or A2 of 483 (FIG. 9a) coupled to the transistor 474 via a resistor 486. The AND gates A1, A2 of 483 (FIG. 9a) are controlled by a control register 206 (FIG. 12) via leads 187, 188 (FIGS. 9a and 12). The LEDs 476, 479 are controlled by gate A2 of 483 (FIG. 9a) via transistors 477 and 478, respectively. LED 491 is controlled by gate A4 of 483 (FIG. 9a). Both gates A3 and A4 are controlled by control register 448 (FIG. 9a), and the flasher multivibrator consisting of inverters B3 and B4 of 484 (FIG. 9a), resistors 35, 485 and capacitor 44 (FIG. 9a). Whenever gates A3 and A4 are enabled, the flasher multivibrator causes the respective lamps (LED) 473 (T) and 482 (A) to flash indicating a failure or alarm condition.

MANUAL INPUTS

Referring to FIG. 9b, the manual input circuit 48 has four input switches 93–96, that require a coded input for a selected alarm signal or command signal. If the switches are operated in a random manner, a tamper alarm will be generated. The procedure for initiating a command commences by touching the switch button flush with the metal case, putting a ground on the insulated pin or switch 94 (FIG. 9b) causing the Schmitt trigger 97-B to output a positive voltage on the exclusive OR gate 143 through diode 106 and discharging capacitor 115. The capacitor 142 charges at this time. The access code selector 87 (FIG. 9b) has three diodes (in the DIP package) selecting the access code. (The chosen code has a one bit first digit and a two bit second digit, plus the desired third digit code bit(s).) The code selector 87-A provides a positive voltage (from inverter 100 with the shift register 101 reset) to the second input of the exclusive OR gate 143 (FIG. 9b).

During the time switch 94 (FIG. 9b) is contacted, and due to the charged capacitor 142, for an extended time after the switch is released, the output of the exclusive-OR still remains negative. As soon as the switch 94 (FIG. 9b) is released, the positive voltage from the output of the Schmitt trigger 97-B (FIG. 9b) goes negative, but the input of the exclusive-OR 143 is held positive for a time by capacitor 142. The capacitor 115 (FIG. 9b) now charges, via resistor 114, putting a negative pulse on AND gate 142 and NAND gate 127 (FIG. 9b). At this time, the output of the exclusive-OR remains negative, and the output of the inverter 123 (FIG. 9b) is positive because the shift register 101-H2 is negative. Therefore, at the time the negative pulse was put on the inputs of gates 127, 142 (FIG. 9b) the output of AND gate 130 was negative. The NAND gate 203 (FIG. 9b) (both inputs negative) produces a negative output which clocks a "one" input into H1 of SR (shift register) 101 (FIG. 9b). The AND gate 126 output remains negative. (The SR 101 is the valid and SR 449 is the invalid register.)

The shifting of the SR 101 (FIG. 9a) represents a valid input code. If, for example, switch 93 had been contacted, the exclusive-OR 137 would have caused gate 137 (FIG. 9b) to have a positive output, in turn providing a positive output on AND gate 130, and when the switch 93 was released, the negative pulse on NAND gate 127. This condition, both inputs to AND gate 126 being positive, provides a positive pulse to SR 449 (FIG. 9b), clocking a "one" into J1 of SR 101 (FIG. 9b), and also provides a positive pulse to AND gate 136. This provides an enable pulse to the triple AND gate 113 (FIG. 9b), permitting a code output for the first digit as an emergency code, but still stepping the invalid code shift register. As can be seen on FIG. 9b, SR 449 will output a tamper alarm from J2–J4 on lead 196 (FIGS. 9b and 11) on the next invalid code input.

The second proper code digit can be seen (by the two diodes in section B of selector 87) to be switch 93 and 94. These two switches, when touched, have to be released together (within, say, 500 milliseconds, depending on the values of capacitors 125, 142, etc.) to be recognized properly.

After the second proper access code has been entered, and the shift register 101 (FIG. 9b) has been stepped to H2, the positive output of H2 will (1) enable AND gate 104 to permit the next input access to the sensor scan and alarm decoder circuit 51 (FIG. 11) via leads 192, 194, 196, 197 (FIGS. 9b and 11), and (2) cause inverter 128 (FIG. 9b) output to go negative, thereby inhibiting any further invalid clock signals to shift register 449 (FIG. 9b).

Figure 11:
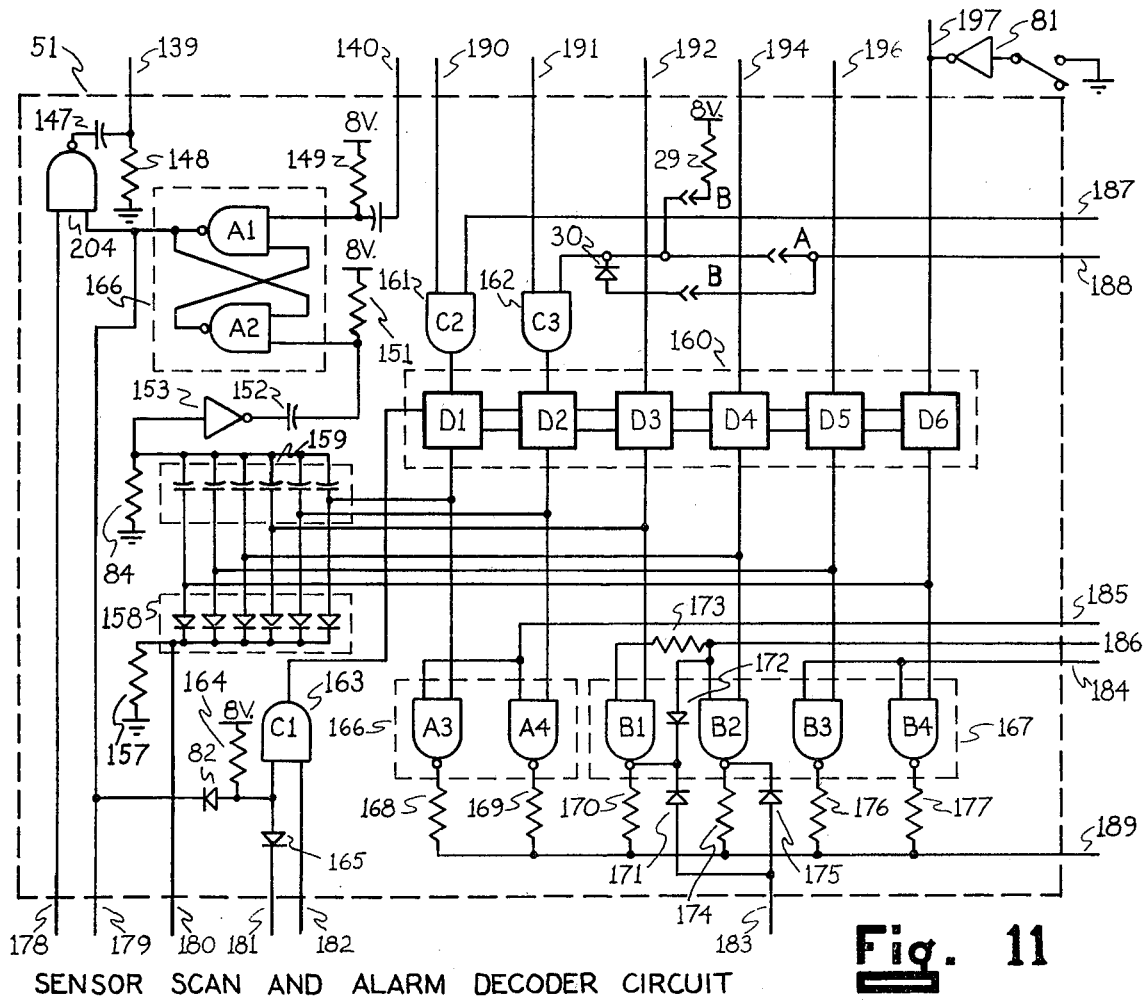
FIG. 11 is a partial schematic of the master module of FIG. 4 and station module of FIG. 5.

The next digit to be entered is a command signal. Any signal entered will be accepted and provide a signal to circuit 51 (FIG. 11).

The diodes 118-123 (FIG. 9b) provide a matrix to generate specific output codes for an initial emergency single digit input code.

The manual input circuit 48 (FIG. 9b) will be reset via lead 202 (FIGS. 9b and 13) when the central module 10 RF carrier F1 or F3 is terminated at the end of the interrogation of the master module 11 (FIG. 1).

The output leads of FIG. 9b, consisting of 191, 192, 194, 196, 197 and 202 (FIGS. 9b and 11) connect the manual input circuit 48 (FIG. 9b) to the sensor scan and alarm decoder circuit 51 (FIG. 11) as shown in FIG. 4, and when made positive, initiate an alarm scan sequence from the master module 11 (FIG. 4). The connections are the same as the outputs from the sensor supervisory circuit 54 (FIG. 14) when connected to the sensor scan and alarm decoder circuit 51 (FIG. 11) configured for a station module 12 (FIG. 5). The block diagram 49, 50, 51 (FIGS. 4 and 5) are identical for both master and station modules, and the description to follow will apply to all modules other than a central module 10 (FIG. 3).

SENSOR SCAN AND ALARM DECODER

The sensor scan and alarm decoder 51 (FIG. 11) circuit is an integral part of the sequence counter and gating detector 50 (FIG. 12), and is shown separately for clarity. The circuit is composed of a parallel in/parallel out, input/output (I/O) register 160 (FIG. 11), enabled by a clock (nominally 1.5 kHz) to provide a gate 163 (FIG. 11) controlled scan of the input signals originated by either sensor inputs 54 (FIG. 14) or manual inputs 48 (FIG. 9b). The NAND gates 166, 167 (FIG. 11) are six current gates (via selected current resistors 168, 169, etc.) that control the current on the summation bus in the same manner as the ten current gates of the sequence counter of FIG. 12.

Any output from the parallel in/parallel out I/O register 160 (FIG. 11) will (1) initially be capacitively coupled (via capacitor 159) to inverter 153 (FIG. 11), (2) diode coupled to lead 180 via diodes 158 (FIGS. 11 and 12), and (3) directly coupled to NAND gates 166, 167 (FIG. 11). The NAND gates 166, 167 are enabled sequentially via leads 184-186 (FIGS. 11 and 12) when the sequence counter 200 (FIG. 12) is stepped through positions F, G and H, thus permitting any output from the I/O register 160 (FIG. 11) to cause an output on the associated NAND gate 166, 167 (FIG. 11). Any operated NAND gate grounds a resistor (e.g., 166-A3 grounds resistor 168), thereby changing the current on the summation bus 189 (FIGS. 11 and 12) which will change the gating of the transmitted RF channel F2.

An output from the I/O register 160 (FIG. 11) through the capacitors 159 provides a negative output on inverter 153, which triggers the alarm bistable 166, thereby putting a negative voltage on one input of NAND gate 204 (FIG. 11). The other input lead 179 (FIGS. 11 and 13) will go negative when the RF carriers have an idle interval. This causes a positive pulse on lead 139 (FIGS. 11 and 12), to put a negative clock pulse, via inverter 213 (FIG. 12), on sequence counter 200 (FIG. 12), stepping it from $A_0$ to $A_1$. At the same time, a negative voltage on lead 179 (FIGS. 11 and 12) is applied to NAND gate 275 (FIG. 12). The NAND gate 275 positive output causes the OR gate 273 (FIG. 12) to enable AND gate 274 permitting the voltage controlled oscillator (VCO) 260 output on lead 205 (FIGS. 12 and 13). The gated output from VCO 260 drives transistor 308 (FIG. 13), gating the RF carrier generator 352 (FIG. 13), to cause the generator 352 to generate the RF carrier F2 or F4 at the selected pulse repetition rate A1 (for the first master module group #1) for the master module 11 (FIG. 1) used in this example. This RF carrier channel F2, transmitted during the central module 10 (FIG. 1) transmit delay interval, is interpreted as an alarm signal, causing an interrupt which switches the central module 10 (FIG. 11) from the supervisory scan subroutine (FIG. 15a) to the alarm scan subroutine (FIG. 15b).

The diode OR gate 158 (FIG. 11) output on lead 180 (FIGS. 11 and 12) is provided to detect a previous "off-normal" alarm during subsequent supervisory scan interrogations when the sequence counter 200 (FIG. 12) reaches the status "STAT" position. This function is implemented by diode AND gate 219, 220 and resistor 280 (FIG. 12) which is enabled by the "STAT" output from counter 200 (FIG. 12) and a positive input on lead 180 (FIG. 12) and causes the output of inverter 242 (FIG. 12) to go negative, thereby grounding the summation bus resistor 283, changing the VCO 260 (FIG. 12) output to "C3", an off-normal indication.

SEQUENCE COUNTER AND GATING DETECTOR

In FIG. 12, the sequence counter 200 and phase lock loop 217 plus ten current gates generate address and data signals to gate the RF carrier channel F2 (or if required F4) in a sequential manner and function to match the incoming RF channel F1 or F3 from the central module 10 (FIG. 1) to produce an output signal when the correct pulse repetition rate is received.

The sequence counter and gating detector circuit 50 (FIG. 12) provides the carrier gating pulse repetition rates, F2 or F4, required for the various address and data signals. The current summation bus 189 (FIGS. 11 and 12) connected to the phase lock loop (PLL) circuit 217 (FIG. 12) provides the counter selected current via resistors 246, 271, etc. (FIG. 12) and 168, 169, etc. (FIG. 11) to control the VCO (voltage controlled oscillator) 260 (FIG. 12) of PLL circuit 217 (FIG. 12). The output of the VCO both generates the pulse repetition rate of the transmitted RF carrier (F2 or F4) on circuit 352 (FIG. 13) and also provides a matching signal for received carrier incoming signals, signals from circuit 331 (FIG. 13) output on lead 207 (FIGS. 12 and 13) to the PLL input 264 (FIG. 12).

When the signal of the VCO 260 (FIG. 12) matches the incoming signal, a match signal is generated on lead 99 (FIG. 12) from PLL 217 (FIG. 12) to the clock input of counter 200 (FIG. 12) and sequences the counter 200 (FIG. 12) to the next step via inverter 250 (FIG. 12), NOR gate 249, resistor 214 and inverter 213 (FIG. 12).

CARRIER GATE CONTROL AND DETECTOR

Circuit 49 of FIG. 13 comprises an RF transformer 293 having a primary winding and two secondary windings. The transformer provides coupling means from all of the remote modules 10, 11, 12 (FIG. 1) to the building power distribution system 8 (FIG. 1) via coupling capacitors 348, 428 (FIG. 13) utilizing existing duplex receptacles. One of the transformer secondaries is used for the transmitting circuit, and is series-tuned by capacitor 309 and driven by transistor 311 from a crystal controlled oscillator 352. The oscillator circuit includes a coupling capacitor 317, a collector resistor 312, an oscillator transistor 313, a resistor 314, resonator 315 which may be, for example, a ceramic or crystal resonator, and capacitor 316, providing a sinusoidal output. The oscillator is synchronously gated by transistor 308, having a collector resistor 306 and a base resistor 207. As stated earlier, more than one transmitter each using a different RF frequency in the range of approximately 150 to 350 KHZ may be used in a particular module. The synchronous gating, i.e., gating at zero crossings of the RF cycle, minimizes the spurious frequencies and harmonics that are generated by the gating process.

The other transformer secondary is used for the receiving circuit 331 (FIG. 13). Again, as shown in the diagram, more than one circuit will be used in particular modules. The receiver consists of a coupling series resonant capacitor 323, and transistor biasing resistors 322 and 324 which are used to bias an emitter follower transistor 321 in the linear conduction region. A coupling capacitor 326, limiting resistor 327, isolating capacitor 328, resonator 329, and loading resistor 330 provide a narrow bandpass filter driven by the transistor 321 which serves as an amplifier. A diode 332 acts as a DC restorer to bias the output level of the received frequency coupled via a capacitor 333 to a transistor 336 biased by resistors 234 and 335. The output of the transistor 336 is taken from a collector load resistor 343 and applied to two integrator circuits. One integrator consists of a rectifier 341, a resistor 342, and a capacitor 344 and provides an RC time constant and furnishes a gated signal to the PLL circuit 217 (FIG. 12) via lead 207 (FIGS. 12 and 13). The second integrator consists of a rectifier 337 (FIG. 13), a resistor 338, capacitor 339, a bleeder resistor 480, and a NOR gate 340, and provides an end-of-transmission signal to the reset input of the sequence counter 200 (FIG. 12) for restoring the remote modules. In the minimal systems using the transmission delay interval, the circuit 331 (FIG. 13) has another integrator circuit consisting of a diode 345, a resistor 347, and a capacitor 346 (FIG. 13) responsive to any RF carrier coupled via lead 178 (FIGS. 11 and 13) to a NAND gate 204 (FIG. 11). This circuit will allow an alarm to access the central module 10 (FIG. 1) during the transmission delay interval.

FIG. 13 also has a power supply composed of a capacitor 289, a resistor 290, a diode 291, a battery trickle charging resistor 295, a filter resistor 297, a capacitor 298, a voltage regulator transistor 300, a ripple filter capacitor 299, a Zener diode voltage regulator 305, a voltage monitor circuit resistor 301, a transistor 302 and a resistor 303 which is responsive to a low voltage condition and provides a regulated voltage on lead 193 (FIGS. 12 and 13). If the battery voltage of FIG. 13 drops below the Zener 305 voltage, the transistor 302 conducts applying a positive voltage on lead 193 (FIGS. 12 and 13). A positive voltage causes the output of NAND gate 232 (FIG. 12) to go negative and the resultant current through resistor 224 increases the current on the summation bus, altering the pulse repetition rate (PRR) to a "C2" status.

SENSOR SUPERVISORY CIRCUIT

Figure 14:
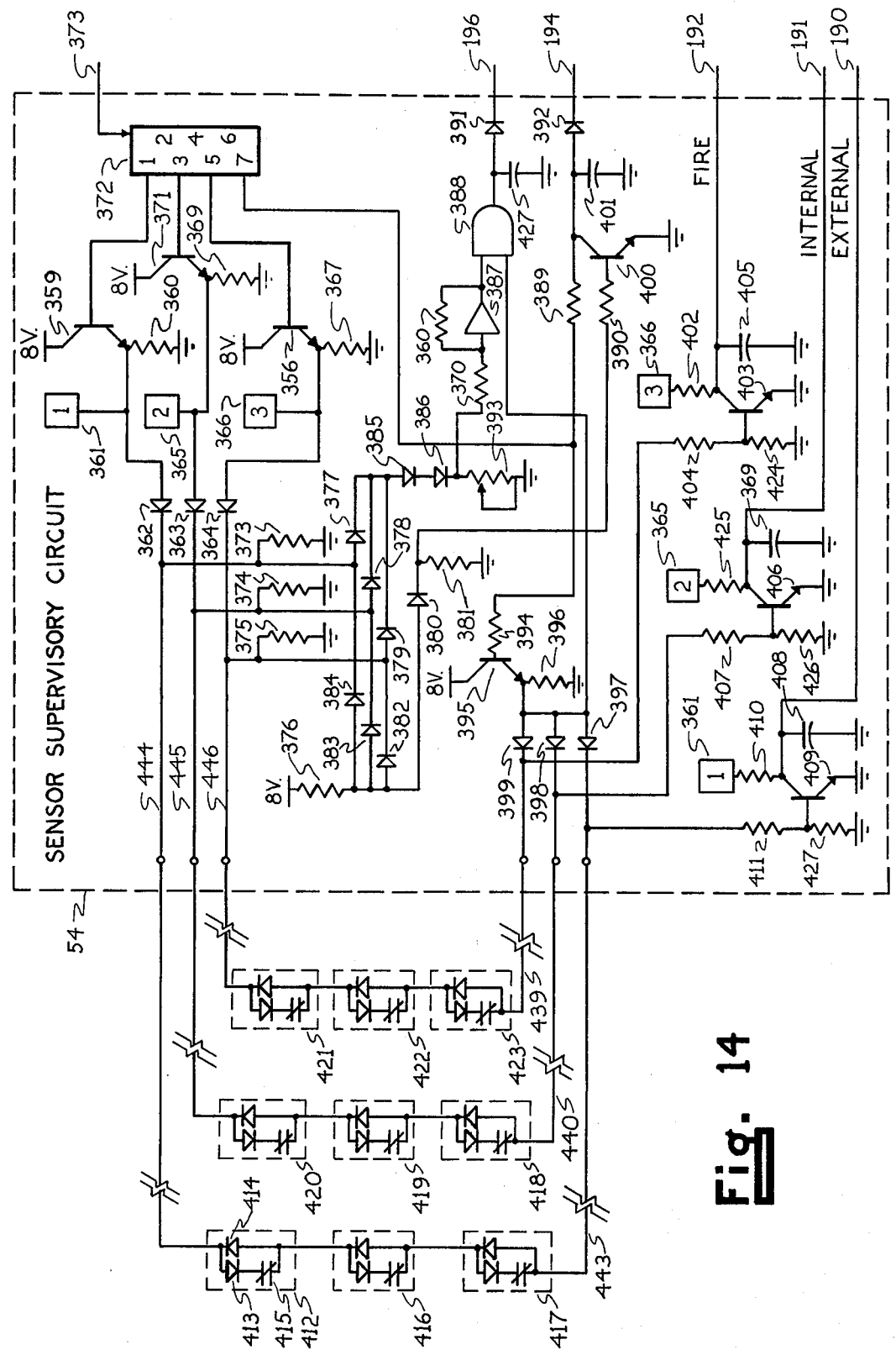
FIG. 14 is a schematic diagram of a station module supervised sensor loop circuit and representative sensors of the block diagram of FIG. 5.

The sensor supervisory circuit of FIG. 14, utilized in station module 12 (FIG. 5) is provided to actively monitor the sensors and transducer connected to the station modules by alternately checking the continuity and bypassing (shunting) of any sensor, plus indicating normal operating conditions.

The circuit consists of an 8-bit counter which is responsive to a system clock 373 (FIG. 12) and sequentially energizes three transistor driver circuits 359, 371, and 356 (FIG. 14) and one reverse test transistor 395 (FIG. 14). The counter in step 1 turns on transistor 359 thereby applying a positive voltage from a source of positive voltage 361 to a transistor 409 and to a sensor loop 444–443 (FIG. 14) via diodes 362 and 413 through a switch 415, a diode and switch combination 416, a diode and switch 417 thereby applying a positive voltage through a resistor 411 to the base of a transistor 409 (FIG. 14). This positive voltage on the base of the transistor 409 causes the transistor 409 to conduct thereby maintaining the output lead 190 (FIGS. 14 and 11) at ground. If any switch opens in the sensor loop 444–443, the transistor 409 turns off, applies a positive voltage on lead 190 and initiates an alarm (switch open) at circuit 51 (FIG. 11). The same conditions exist for the other two loops 445–430 and 446–439 during step 3 and step 5, respectively, of counter 372.

When the counter 372 is at step 7, a positive voltage is applied to a collector resistor 389 thereby energizing a transistor 400 and applying a positive voltage to the base of a transistor 395 via a base resistor 394. The transistor 395 turns on applying a positive voltage through diodes 397–399 to all three sensor loops. All three loops via the reversed switch diodes i.e., 414, apply a positive voltage to a diode AND gate consisting of diodes 382–384, thereby applying a positive voltage on the base of transistor 400 via diode 380 and base resistor 390. This grounds the output of transistor 400 appearing on lead 194 (FIGS. 14 and 11). However, if any sensor loop is broken or open, such as, for example, switch 421, the output of the diode AND gate will be negative. This causes transistor 400 to turn off and applies the positive voltage present on resistor 389 to lead 194 (FIGS. 14 and 11) in order to initiate an alarm (circuit open) at circuit 51 (FIG. 11).

The positive voltage from the AND gate 382–384 is applied to an OR gate consisting of diodes 377–379 (FIG. 14) and supplies a current through diodes 385–386 (FIG. 11) and variable resistor 393. The IR drop through resistor 393 is adjusted (depending on the diode drops in each loop) to a level below the trip voltage of a Schmitt trigger 387. Transistor 395 also applies a positive voltage at this time to one input of AND gate 388. The other input is held negative by the Schmitt trigger 387. Therefore, the output of AND gate 388 is negative on lead 196. If any switch unit or sensor loop is shunted or by-passed, an increase in loop current will occur due to an increased effective loop voltage (loss of diode drop). The increased loop current switches the Schmitt trigger on causing the AND gate 388 output to go positive on lead 196 (FIGS. 14 and 11) and initiate a tamper alarm. The external input lead 190 and internal input 191 (FIGS. 14 and 11) are under control of the loop set/reset gates 161, 162 (FIG. 11) enabled by control register 206 (FIG. 12).

INITIALIZE AND CORRELATE

During initial installation and subsequent central station 21 (FIG. 1) computer commands, two procedures are invoked that firstly, reset all counters, registers and timers of the central module 10 (FIG. 1) processor, and secondly, determine by a correlation scan which type of remote modules were installed, how many master modules 11 (FIG. 1) are present, and what station modules 12 (FIG. 1) are associated with each master module 11. This correlation information is stored in the memory 41 (FIG. 3) of the central module 10, and is also transmitted via an FSK transmission modem 33 (FIG. 3) or otherwise, to the central station computer 21 (FIG. 1) for reference information, as well as all remote station 12 (FIG. 1) data.

SUPERVISORY SCAN

At the beginning of the supervisory scan, with all of the remote modules restored or reset and the master groups correlated, the supervisory scan is initiated. When the central module 11 (FIG. 1) transmits on channel F1 the signal F1:A1, the master (GRP#1) module 11 (FIG. 1) detects the signal on PLL1 217 (FIG. 12) that matches its (GRP) signal, and the PLL1 217 output goes true, clocking sequence counter 200 (FIG. 12) via inverter 250, NOR gate 249, NAND gate 474, and inverter 213 from $A_0$ to $A_1$ (GRP). The counter 200 (FIG. 12) A1 true outputs into the input of the AND gate 284 (FIG. 12), via diode 79 and the PLL1 217 (FIG. 12) true output and causes AND gate 284 (FIG. 12) to go true. The AND gate 284 enables AND gate 274, permitting the VCO 260 (FIG. 12) gating signal A1 to output on lead 205 (FIGS. 12 and 13) to cause transmitter 352 (FIG. 13) to transmit the F2:A1 signal. The central module 10 detects F2:A1 via PLL 217 (FIG. 3) and circuit 71 terminates F1:A1 and transmits F1:B1.

The master module 11 PLL1 217 (FIG. 12) goes false, and the negative differentiator (capacitor 482, resistor 248 and NOR gate 216) pulses inverter 213 on clocking counter 200 to step B (STA) which grounds the output of inverter 244 and resistor 271 generates B1. The master module 11 PLL1 217 matches this signal and goes true; however, AND gate 274 is not enabled during (STA) position (grounded via diode 244 to AND gate 474) thereby blocking the clock input to counter 200. Consequently, the counter 200 remains at step B (STA). The PLL1 217 and counter 200 (STA) true output to AND gate 284 (FIG. 12) via diode 80 (FIG. 12). This enables AND gate 274, permitting the transmission of F2:B1.

When the central module detects F2:B1, it terminates the transmission of F1:B1, and under program control, transmits F1:0 and waits for the master module 11 (FIG. 1) transmission of F2:Cn. The termination of F1:B1 causes the output of the master module 11 to go false and the negative differentiator (capacitor 247, resistor 477, and inverter 475) (FIG. 12) pulses AND gate 474 on (the capacitor 481 holds the PLL1 217 input to gate 474 on during this time), thereby clocking counter 200 to step C (STAT) position. At this time, both inputs to NOR gate 449 (FIG. 12) go negative providing a positive output through diode 473 to enable AND gate 274 for the rest of the counter 200 sequence. This permits the master module 11 to initiate the transmission of the gated RF carrier F2.

The master module 11 (FIG. 1) is now the transmitter, and the central module 10 (FIG. 1) is the receiver and goes into a memory scan mode to find the required match signal D1–D8 through K1–K8 before transmitting a reply on channel F1. The inverter 272 (FIG. 12) output on lead 181 (FIGS. 11 and 12) to AND gate 163 (FIG. 11) inhibits the scan clock to the I/O register 160 (FIG. 11), locking the alarm or command signal data in the I/O register 160 until the module is restored. If there is a positive voltage on any of the parallel output register 160 (FIG. 11) outputs, a positive voltage will exist on lead 180 (FIGS. 11 and 12) via diodes of 159. This positive voltage causes the output of the AND gate (consisting of diodes 219 and 220) (FIG. 12) to go positive, causing the inverter 242 output to go negative. Thus, the resistor 283 (FIG. 12) increases the current on the summation bus, changing the pulse repetition rate to a C3 status. This status indicates a previous alarm (off-normal condition) still exists, indicated by a positive output on register 160 (FIG. 11). The "STAT" indication C3 causes the central module 10 to make a full ten interrogation sequence.

If there is a negative output from register 160 (FIG. 11) and "STAT" is either C1 or C2, the central module will interrogate three times, A through C, and then terminate transmitting RF carrier F1, thereby restoring the master module 11.

The central module 10 (FIG. 3) program, after processing the "GRP" and "STA" address interrogations, maintains transmitting the RF carrier F1 and locally scans the C1–C3 "STAT" pulse repetition rates until it matches the received F2:Cn signal transmitted by the master module 11 (FIG. 1). After finding the transmitted "C" signal, the central module 10 now transmits this signal on F1 back to the master module 11. The signal is detected by the PLL1 217 (FIG. 12) and steps the master module 11 to "CORR", step D. The output of PLL1 217 of the gate control and detector control of module 10 goes negative (due to loss of match) and the interrupt signal ceases. This causes the alarm scan routine to search for a match, now in the "CORR" group. When the central module 10 finds the correct "CORR" match, the PLL1 217 (FIG. 3) sends an interrupt to the MPU 43 (FIG. 3) which instructs the PIA 43 (FIG. 3) to transmit the signal F1:Dn back to the master module 11. The master module 11 detects this signal matched at PLL1 217 (FIG. 12) and steps the master module to "TYPE", step E, transmitting F2:En. The control module 10 detects the change in signal and proceeds to scan (in memory) for a match for "TYPE". When the match is found, it is transmitted back, F1:En, to the master module 11. This procedure continues through the interrogation of "DAT1", "DAT2" and "DAT3", which receive the signals from the circuit 51 (FIG. 11) alarm decoder section of the summation bus described earlier.

The "COMM" position is sequenced in the same manner, except that it is a fixed signal and does not have to be scanned. The "SET" position is described in detail in the master module operation control.

When the central module 10 (FIG. 1), under program control, is not required to change the state of control register 206 (FIG. 12), the control module 10 (FIG. 12) (after receiving the "SET" signal from the master module 11 (FIG. 1) F2:K1) does not return a verification signal F1:K1 (F3:K1 when controlling the control register 448 (FIG. 9a)) but terminates transmission of F1 which causes the master module to restore, maintaining existing status of the register 260. If the central module 10 (FIG. 1) is required to change the state of control register 206 (FIG. 12), the control module 11 (FIG. 1) now returns the F2:K1 signal on F1:K1. This causes the control register 206 (FIG. 12), previously $\overline{F1}$, $\overline{F2}$ to step to F1, F2 and to switch the output of NAND gate (C3) 229 (FIG. 12) to ground. This causes resistor 222 to alter the current on the summation bus to cause the VCO 260 (FIG. 12) to gate the carrier F2:K2. The central module 10 (FIG. 1) receives this signal and determines if that is the state required. If it is not, the central module 10 (FIG. 1) again matches the signal and transmits $\overline{F1}$:K2, which steps the control register 206 (FIG. 12) to F1, F2. At the desired state, the carrier terminates.

When the sequence counter 200 (FIG. 12) is sequenced to step K "SET38, the output of the PLL1 217 (FIG. 12) is switched from clocking the sequence counter 200 (FIG. 12) to clocking the control register 206 (FIG. 12). This is accomplished via the "SET" output, now positive, causing AND gate 230 (FIG. 12) output to go positive, enabling NAND gates 228, 229 (FIG. 12), thus permitting the outputs of control register 206 (FIG. 12) to be read and also enabling the AND gate 227 (FIG. 12) and blocking the NOR gate 249 (FIG. 12). Therefore, the output of the PLL1 217 (FIG. 12) on lead 99 clocks register 206 instead of register 200 when the PLL1 217 (FIG. 12) locks. When channel F3 is used, a second phase lock loop PLL2 217 (FIG. 12) is utilized, as is a second RF receiver 331 (FIG. 13) which blocks via lead 203 (FIGS. 12 and 13) AND gate 230 (FIG. 12) and enables AND gate 86 (FIG. 9a) via lead 99 (FIGS. 9a and 12) to clock the counter register 448 (FIG. 9a) from the lead 99. The status of register 448 will be read from AND gate 436, 437 (FIG. 9b).

The master modules 11 (FIG. 1) require both channels F1 and F3 to control the control registers 260 (FIG. 12) and 448 (FIG. 9a) to operate the visual indicators shown in FIG. 9a. The visual indicators (LEDs) indicate when the system is in the test mode (T) 473, whether the external (E) 477 or internal (I) 479 security loops are set, and if the system is in alarm (A) 482 (FIG. 9a). Control registers 206 (FIG. 12) and 448 (FIG. 9a) are sequenced through the four states of (F1) (F2) of 206 (FIG. 12) and (Q1) (Q2) of 448 (FIG. 9a) and when the sequence counter 200 (FIG. 12) has been sequenced to step "K" or "SET" position. Control register 448 (FIG. 9a) is under the control of channel F3. Control register 206 (FIG. 12) is under the control of channel F1. Since channel F1 (the supervisory scan and alarm scan channel) controls the control register 206 (FIG. 12), all of the station modules 12 can be controlled in this manner.

Figure 10:
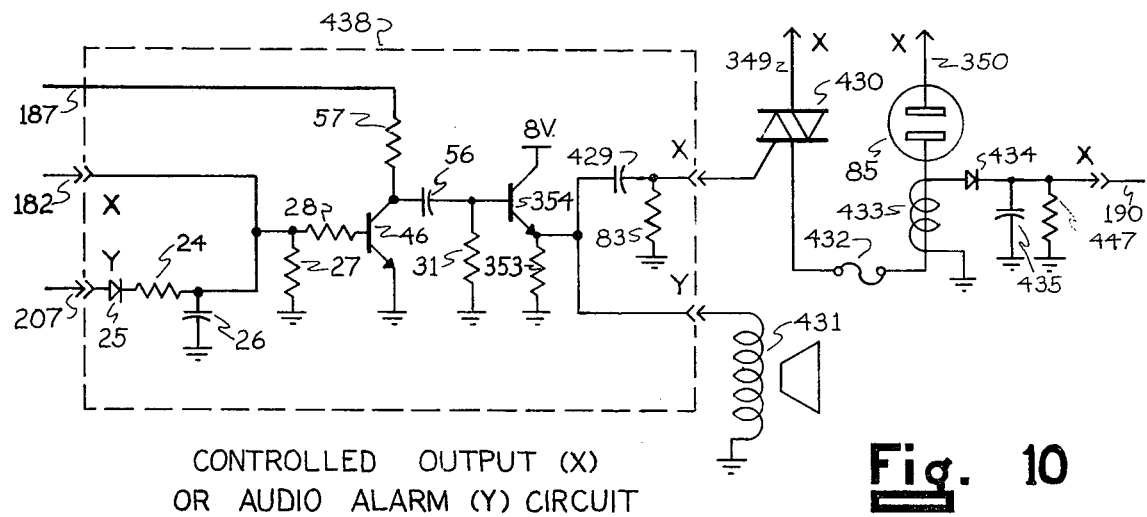
FIG. 10 is a partial schematic of a controlled output or an alarm module remote station module configuration of FIG. 5.

The operation of the station modules 12 (FIG. 1) is identical to that described for the master module 11, except the manual input and visual indicator circuits 47 and 48 (FIG. 4) are replaced by the sensor supervisory circuit 54 (FIG. 5). The station modules 12 (FIG. 1) have the capability of using either an alarm output option (FIG. 10), option Y, or a controlled output option (FIG. 10), option X, also controlled by the control register 206 (FIG. 12). The alarm or controlled output circuit 438 (FIG. 10) consists of a two stage, AC coupled amplifier option X, driving a triac 430 in series with fuse 432 and receptacle 85 with a current sensing coil 433 and rectifying circuit diode 434, capacitor 435, a bleeder resistor 447 coupled thereto. The output on lead 190 (FIGS. 10 and 11) indicates output circuit status. The control register 260 (FIG. 12) via lead 187 (FIGS. 12 and 10) provides amplifier control power to transistor 46 (FIG. 10). The VCO 260 (FIG. 12) provides gating pulses on lead 182 (FIGS. 12 and 10) to gate the triac 430 connected to the power line 8 (FIG. 1). When option Y is used, the input to the amplifier, lead 207 (FIGS. 10 and 13) is provided by the central module 10 (FIG. 1) under program control to generate audio signals outputted by the transducer 431 (FIG. 10).

Figure 7A:
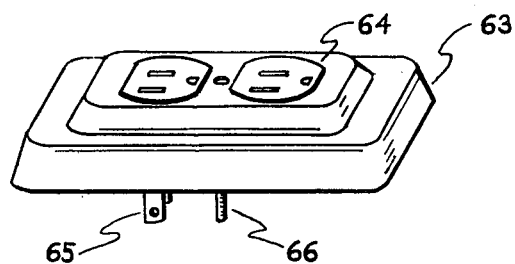
FIG. 7 is a pictorial view of the station module of the system of FIG. 1.
Figure 7C:
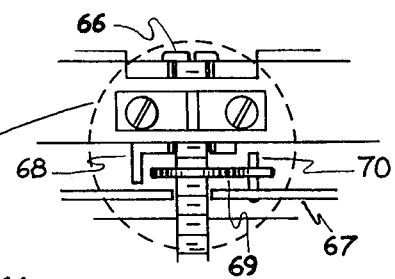
Figure 7B:
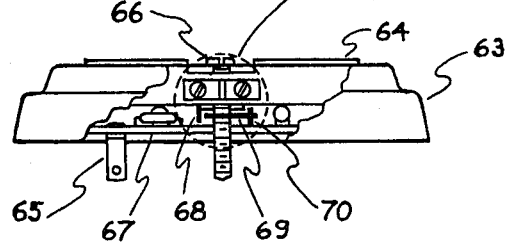

The circuit of FIG. 7c shows an enlarged view of a module tamper switch composed of an insulated pin 68, a metallic contact pin 70 attached to a printed circuit board and a rotating eccentric disc 69 that threads onto the module 63 mounting screw 66. When the mounting screw 66 is rotated clockwise, the metallic disc 69 contacts the insulated pin 68 when the module is installed. When an attempt is made to remove the module 63 by turning the mounting screw 66 counterclockwise, a partial turn causes the metallic disc 69 to contact the metallic contact pin 70, grounding the input to inverter 81 (FIG. 11), thus applying a positive input to the parallel input/output register 160 (FIG. 11) on lead 197 (FIG. 11).

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A monitoring and control system comprising; a full duplex central module and a plurality of full duplex station modules, means within the central module for continuously and sequentially monitoring the status conditions of said station modules, said central module including means for transmitting a first synchronously gated sinusoidal carrier current signal on a first carrier current frequency of a full duplex channel pair of carrier current frequencies, wherein each first signal transmitted comprises a plurality of discrete, sequential, synchronously gated sinusoidal carrier current signals on the first carrier current frequency for each interrogation, and means responsive to the same sequential synchronously gated sinusoidal carrier current signals on the second carrier current frequency of the full duplex pair for terminating the generation of signals on the first carrier current frequency upon the receipt and verification of signals on the second carrier current frequency, thereby determining the duration of each of said discrete sequential signals, and wherein each of said station modules includes means for receiving the carrier current signals from said central module and responding to the received signals on said second carrier current frequency to terminate the transmission of said signals by said central module upon receipt thereof, each of said station modules further including logic circuitry for providing a signal to said central module for indicating an off-normal condition.

2. The monitoring and control system recited in claim 1 wherein the synchronously gated carrier current signals transmitted on said first and second carrier current frequencies are each gated at substantially the same frequency and each contain a single unit of information.

3. A monitoring and control system comprising; a full duplex central module and a plurality of full duplex station modules, means for continuously monitoring from the central module the status conditions of said station modules utilizing an improved communications system comprising means for generating a synchronously gated sinusoidal carrier current signal located in each of said modules, said carrier current signals having first and second frequencies arranged in a full duplex two frequency transmission pair common to all modules, means for coupling said carrier current signals to an AC power distribution system, said central module including means for continuously and sequentially interrogating all of said station modules by selectively addressing each station module, said station modules having receiving means responsive to synchronously gated carrier current interrogation signals on one frequency of said duplex pair from said central module for rendering the carrier current signal generating means operative to provide a carrier current verification signal on the other frequency of said duplex pair to said central module, wherein said interrogation signals comprise a plurality of discrete, sequential synchronously gated carrier current signals, and have durations controlled by the receipt of the verification signals, said station modules also including means for sensing an off-normal condition and transmitting an off-normal condition indicative signal to said central module upon the occurrence of an off-normal condition.

4. The monitoring and control system claimed in claim 3 wherein each of said carrier current generating means includes means for generating a carrier frequency on the order of approximately three to four orders of magnitude greater than the frequency of the AC power distribution system.

5. The monitoring and control system claimed in claim 3 wherein said central module includes means responsive to the absence of a verification signal within a predetermined time period following an interrogation for indicating a transmission failure.

6. The monitoring and control system claimed in claim 3 wherein each of said station modules includes means for transmitting data signals indicative of the status of said module on the second frequency of said full duplex transmission pair.

7. A monitoring and control system as recited in claim 3 wherein said central module includes means connectable to a telephone line for applying status information to said telephone line.

8. The monitoring and control system recited in claim 3 wherein said central module includes means for rendering said central module nonresponsive to signals received from a predetermined one of said station modules.

9. A monitoring and control system as claimed in claim 3 wherein each of said modules operate on power received from the AC power distribution system and further include means for storing electrical energy for powering said module in the event of a power failure.

10. The monitoring and control system claimed in claim 3 wherein said module includes means responsive to tampering with said module for providing a signal indicative of said tampering.

11. The monitoring and control system claimed in claim 3 further including a central computer coupled to said central module via a telephone line, said central computer being responsive to signals received from said central station.

12. The monitoring and control system claimed in claim 3 wherein each of said modules includes means for comparing transmitted and received signals, and for terminating the transmission of a transmitted signal upon received signal having a predetermined relationship to the transmitted signal.

13. The monitoring and control system claimed in claim 12 wherein said transmitted and received signals are each synchronously gated current signals gated in a predetermined sequence, and wherein said predetermined relationship occurs when the transmitted and received signals are gated in the same sequence.

14. The monitoring and control system recited in claim 12 wherein said transmitted and received signals are each synchronously gated at a predetermined gating frequency, and wherein said predetermined relationship occurs when the gating frequencies of the transmitted and received signals are substantially the same.

15. The monitoring and control system recited in claim 14 wherein each module includes means for detecting the gating frequency of a signal received on one frequency of said duplex pair and for transmitting a signal with substantially the same gating frequency on the other frequency of the duplex pair in response thereto.

16. The monitoring and control system recited in claim 15 wherein each interrogation and verification signal transmitted contains only a single unit of information.

* * * * *